United States Patent
Kuriyama et al.

(10) Patent No.: US 9,285,628 B2
(45) Date of Patent: Mar. 15, 2016

(54) LIQUID CRYSTAL DISPLAY DEVICE

(71) Applicant: DIC CORPORATION, Tokyo (JP)

(72) Inventors: Takeshi Kuriyama, Kita-adachi-gun (JP); Jouji Kawamura, Kita-adachi-gun (JP); Seiji Funakura, Kamisu (JP); Katsunori Shimada, Sakura (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/114,848

(22) PCT Filed: Jan. 21, 2013

(86) PCT No.: PCT/JP2013/051079
§ 371 (c)(1),
(2) Date: Oct. 30, 2013

(87) PCT Pub. No.: WO2014/112122
PCT Pub. Date: Jul. 24, 2014

(65) Prior Publication Data
US 2015/0316815 A1    Nov. 5, 2015

(51) Int. Cl.
*C09K 19/06* (2006.01)
*G02F 1/1335* (2006.01)
*C09K 19/30* (2006.01)

(52) U.S. Cl.
CPC ...... *G02F 1/133514* (2013.01); *C09K 19/3066* (2013.01); *G02F 1/133512* (2013.01)

(58) Field of Classification Search
CPC ............... C09K 19/06; C09K 19/3006; G02F 1/133512; G02F 1/133514
USPC ............... 349/167, 168, 182, 183, 106, 108; 252/299.01, 299.1, 299.6, 299.61, 252/299.63, 299.66; 428/1.1
See application file for complete search history.

(56) References Cited

U.S. PATENT DOCUMENTS

| 8,804,092 B2 * | 8/2014 | Klement et al. ............ 349/168 |
| 8,885,124 B2 * | 11/2014 | Kaneoya et al. ............ 349/108 |
| 2006/0257763 A1 | 11/2006 | Araki |

FOREIGN PATENT DOCUMENTS

| JP | 2000-019321 A | 1/2000 |
| JP | 2000-192040 A | 7/2000 |
| JP | 2006-317602 A | 11/2006 |
| JP | 2009-109542 A | 5/2009 |
| JP | 2010-189560 A | 9/2010 |
| JP | 2011-141356 A | 7/2011 |
| WO | 2010/095506 A1 | 8/2010 |

OTHER PUBLICATIONS

International Search Report for PCT/JP2013/051079, Mailing Date of Mar. 5, 2013.

* cited by examiner

*Primary Examiner* — Geraldina Visconti
(74) *Attorney, Agent, or Firm* — Westerman, Hattori, Daniels & Adrian, LLP

(57) ABSTRACT

There is provided a liquid crystal display device capable of preventing a decrease in voltage holding ratio (VHR) of a liquid crystal layer and an increase in ion density (ID) and resolving the problem of display defects such as white spots, alignment unevenness, image sticking, and the like. The liquid crystal display device prevents a decrease in voltage holding ratio (VHR) of a liquid crystal layer and an increase in ion density (ID) and suppresses the occurrence of display defects such as image sticking, and the like. The liquid crystal display device is useful for an IPS-mode or FES-mode liquid crystal display device for active matrix driving. The application of the device can include liquid crystal TVs, monitors, cellular phones, smart phones, and the like.

11 Claims, 1 Drawing Sheet

LIQUID CRYSTAL DISPLAY DEVICE

TECHNICAL FIELD

The present invention relates to a liquid crystal display device.

BACKGROUND ART

Liquid crystal display devices have been used for watches and electronic calculators, various household electric appliances, measuring apparatuses, automotive panels, word processors, electronic notebooks, printers, computers, televisions, etc. Typical examples of a liquid crystal display mode include a TN (twisted nematic) mode, a STN (super twisted nematic) mode, a DS (dynamic light scattering) mode, a GH (guest-host) mode, an IPS (in-plane switching) mode, an OCB (optically compensated birefringence) mode, an ECB (electrically controlled birefringence) mode, a VA (vertical alignment) mode, a CSH (color super-homeotropic) mode, a FLC (ferroelectric liquid crystal), and the like. Also, multiplex driving is popularized as a driving method instead of usual static driving, and a simple matrix mode and a recent active matrix (AM) method of driving by TFT (thin-film transistor), TFD (thin-film diode), or the like become the mainstream.

As shown in FIG. 1, a general color liquid crystal display device includes two substrates (1) each having an alignment film (4), a transparent electrode layer (3a) serving as a common electrode and a color filter layer which are disposed between one of the alignment films and the substrate, and a pixel electrode layer (3b) disposed between the other alignment film and the substrate, the substrates are arranged so that the alignment films thereof face each other, and a liquid crystal layer (5) is held between the substrates.

The color filter layer is composed of a black matrix and a color filter including a red color layer (R), a green color layer (G), a blue color layer (B), and, if required, yellow color layer (Y).

Liquid crystal materials constituting liquid crystal layers have undergone a high level of impurity control, because impurities remaining in the materials significantly affect electric characteristics of display devices. In addition, with respect to materials constituting alignment films, it has already been known that an alignment film is in direct contact with a liquid crystal layer, and impurities remaining in the alignment film are moved to the liquid crystal layer and affect the electric characteristics of the liquid crystal layer, and thus characteristics of a liquid crystal display device due to impurities in an alignment film material have been being investigated.

On the other hand, with respect to materials such as organic pigments and the like used in the color filter layers, like the alignment film materials, it is supposed that impurities contained affect the liquid crystal layers. However, an alignment film and a transparent electrode are interposed between the color filter layer and the liquid crystal layer, and thus it has been considered that the direct influence on the liquid crystal layer is greatly smaller than that of the alignment film material. However, the alignment film generally has a thickness of as small as 0.1 µm or less, and the transparent electrode, for example, even a common electrode used on the color filter layer side and having a thickness increased for enhancing conductivity, generally has a thickness of 0.5 µm or less. Therefore, the color filter layer and the liquid crystal layer are not put in a completely isolated environment, and the color filter layer has the possibility of developing display defects such as white spots, alignment unevenness, image sticking, and the like due to a decrease in voltage holding ratio (VHR) of the liquid crystal layer and an increase in ion density (ID) which are caused by impurities contained in the color filter layer through the alignment film and the transparent electrode.

As a method for resolving the display defects due to impurities contained in pigments which constitute a color filter, there have been studied a method of controlling elusion of impurities into a liquid crystal by using a pigment in which a ratio of an extract with ethyl formate is decreased to a specified value or less (Patent Literature 1), and a method of controlling elusion of impurities into a liquid crystal by specifying a pigment in a blue color layer (Patent Literature 2). However, these methods are not much different from a method of simply decreasing impurities in a pigment, and are thus unsatisfactory for improvement for resolving the display defects even in the present situation in which a pigment purifying technique has recently been advanced.

On the other hand, with attention paid to a relation between organic impurities contained in a color filter and a liquid crystal composition, there are disclosed a method of specifying a hydrophobic parameter of liquid crystal molecules contained in a liquid crystal layer to be equal to or higher than a predetermined value, the hydrophobic parameter representing insolubility of the organic impurities in the liquid crystal layer, and a method of preparing a liquid crystal composition containing a predetermined ratio or more of a liquid crystal compound having —$OCF_3$ groups at the ends of liquid crystal molecules because the —$OCF_3$ groups at the ends of liquid crystal molecules have a correlation to the hydrophobic parameter (Patent Literature 3).

However, these cited documents each disclose an invention based on the principle, that the influence, of impurities in a pigment on a liquid crystal layer is suppressed and disclose no research on a direct relation between a structure of a liquid crystal material and a structure of a colorant such as a dye/pigment or the like used in a color filter, not leading to the resolution of the problem of display defects in advanced liquid crystal display devices.

CITATION LIST

Patent Literature

PTL 1: Japanese Unexamined Patent Application Publication No. 2000-19321

PTL 2: Japanese Unexamined Patent Application Publication No. 2009-109542

PTL 3: Japanese Unexamined Patent Application Publication No. 2000-192040

SUMMARY OF INVENTION

Technical Problem

The present invention is aimed at providing a liquid crystal display device including a specified liquid crystal composition and a color filter using a specified dye and/or pigment in order to prevent a decrease in voltage holding ratio (VHR) of a liquid crystal layer and an increase in ion density (ID), thereby resolving the problems of display defects such as white spots, alignment unevenness, image sticking, and the like.

Solution to Problem

In order to solve the above-described problems, the inventors intensively studied combinations of colorants such as a dye/pigment and the like which constitute a color filter and structures of liquid crystal materials constituting a liquid crystal layer. As a result it was found that a liquid crystal display device using a specified-structure liquid crystal composition and a color filter containing a specified-structure dye and/or pigment prevents a decrease in voltage holding ratio (VHR) of a liquid crystal layer and an increase in ion density (ID), thereby resolving the problems of display defects such as white spots, alignment unevenness, image sticking, and the like. This led to the achievement of the present invention.

That is, the present invention provides a liquid crystal display device including a first substrate, a second substrate, a liquid crystal composition layer held between the first substrate and the second substrate, a color filter including a black matrix and at least RGB three-color pixel portions, a pixel electrode, and a common electrode, the liquid crystal composition layer including a liquid crystal composition which contains at least one compound represented by general formula (I),

[Chem.1]

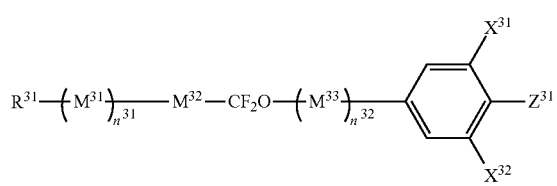

(I)

(in the formula, $R^{31}$ represents an alkyl group having 1 to 10 carbon atoms, an alkoxy group, or an alkenyl group or alkenyloxy group having 2 to 10 carbon atoms, $M^{31}$ to $M^{33}$ each independently represent a trans-1,4-cyclohexylene group or a 1,4-phenylene group, one or two —$CH_2$— in the trans-1,4-cyclohexylene group may be substituted by —O— so that oxygen atoms are not directly adjacent to each other, one or two hydrogen atoms in the phenylene group may be substituted by fluorine atoms, $X^{31}$ and $X^{32}$ each independently represent a hydrogen to or a fluorine atom, $Z^{31}$ represents a fluorine atom, a trifluoromethoxy group, or a trifluoromethyl group, $n^{31}$ and $n^{32}$ independently represent 0, 1, or 2, $n^{31}+n^{32}$ represents 0, 1, or 2, and when a plurality of each of $M^{31}$ and $M^{33}$ present, each may be the same or different), and at least one compound selected from the group consisting of compounds represented by general formula (II-a) to (II-e),

[Chem. 2]

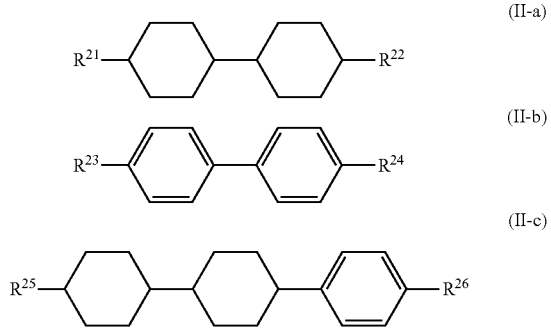

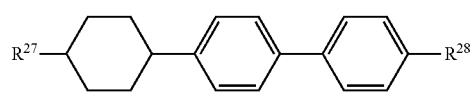

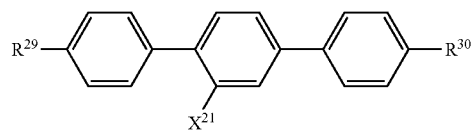

(in the formula, $R^{21}$ to $R^{30}$ each independently represent an alkyl group having 1 to 10 carbon atoms or an alkenyl group having 2 to 10 carbon atoms, and $X^{21}$ represents a hydrogen atom or a fluorine atom), and the RGB three-color pixel portions include, as colorants, a diketopyrrolopyrrole pigment and/or anionic red organic dye in a R pixel portion, at least one selected from the group consisting of a halogenated copper phthalocyanine pigment, a phthalocyanine green dye, and a mixture of a phthalocyanine blue dye and an azo yellow organic dye in a G pixel portion, and a ∈-type copper phthalocyanine pigment and/or cationic blue organic dye in a B pixel portion.

Advantageous Effects of Invention

A liquid crystal display device according to the present invention is capable of preventing a decrease in voltage holding ratio (VHR) of a liquid crystal layer and an increase in ion density (ID) by using a specified liquid crystal composition and a color filter including a specified dye and/or pigment, thereby resolving the problems of display defects such as white spots, alignment unevenness, image sticking, and the like.

Figure 1:
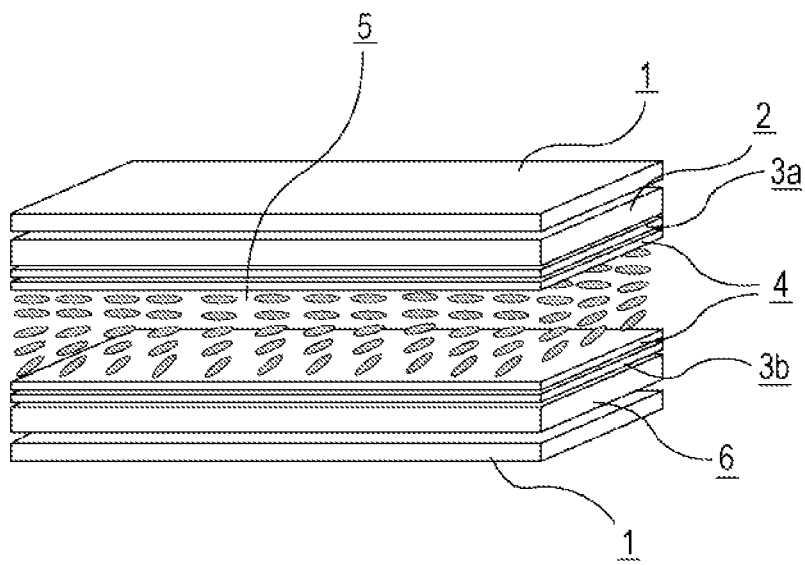
FIG. 1 is a drawing showing an example of a general liquid crystal display device.

REFERENCE SIGNS LIST 1 substrate
2 color filter layer
2a color filter layer containing specified dye and/or pigment
3a transparent electrode layer (common electrode)
3b pixel electrode layer
4 alignment film
5 liquid crystal layer
5a liquid crystal layer containing specified liquid crystal composition

DESCRIPTION OF EMBODIMENTS

Figure 2:
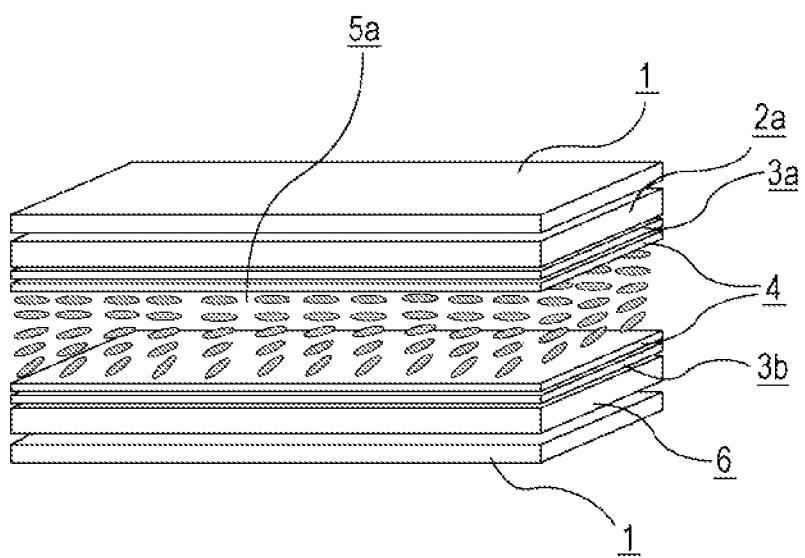
FIG. 2 is a drawing showing an example of a liquid crystal display device according to the present invention.

FIG. 2 shows an example of a liquid crystal display device according to the present invention. Two substrates (1) including a first substrate and a second substrate each have an alignment film (4), a transparent electrode layer (3a) serving as a common electrode and a color filter layer (2a) containing a specified dye and/or pigment are disposed between one of the alignment films (4) and the substrate, a pixel electrode, layer (3b) is disposed between the other alignment film and the substrate, the substrates are arranged so that the alignment films face each other, and a liquid crystal layer (5a) containing a specified liquid crystal composition is held between the substrates.

The two substrates in the display device are bonded together with a sealing material disposed in a peripheral region, and in many cases, a granular spacer or a resin spacer columns formed by a photolithography method is disposed between the substrates in order to maintain a gap between the substrates.

(Liquid Crystal Composition Layer)

A liquid crystal composition layer in the liquid crystal display device of the present invention includes a liquid crystal composition which contains at least one compound represented by general formula (I),

[Chem.3]

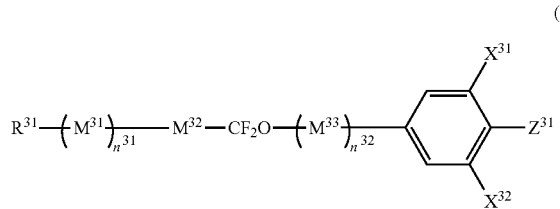

(I)

(in the formula, $R^3$ represents an alkyl group having 1 to 10 carbon atoms, an alkoxy group, or an alkenyl group or alkenyloxy group having 2 to 10 carbon atoms, $M^{31}$ to $M^{33}$ each independently represent a trans-1,4-cyclohexylene group or a 1,4-phenylene group, one or two —$CH_2$— in the trans-1,4-cyclohexylene group may be substituted by —O— so that oxygen atoms are not directly adjacent to each other, one or two hydrogen atoms in the phenylene group may be substituted by fluorine atoms, $X^{31}$ and $X^{32}$ each independently represent a hydrogen atom or a fluorine atom, $Z^{31}$ represents a fluorine atom, a trifluoromethoxy group, or a trifluoromethyl group, $n^{31}$ and $n^{32}$ each independently represent 0, 1, or 2, $n^{31}+n^{32}$ represents 0, 1, or 2, and when a plurality of each of $M^{31}$ and $M^{33}$ are present, each may be the same or different), and at least one compound selected from the group consisting of compounds represented by general formula (II-a) to (II-e),

[Chem. 4]

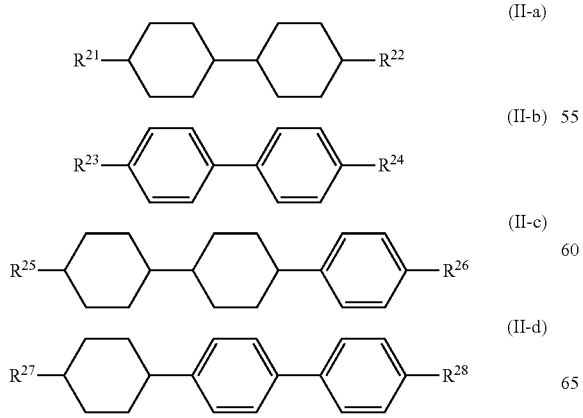

(II-a)

(II-b)

(II-c)

(II-d)

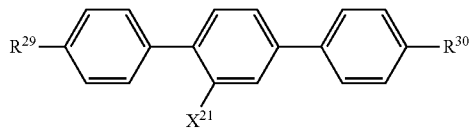

(II-e)

(in the formulae, $R^{21}$ to $R^{30}$ independently represent an alkyl group having 1 to 10 carbon atoms or an alkenyl group having 2 to 10 carbon atoms, and $X^{21}$ represents a hydrogen atom or a fluorine atom).

In the general formula (I), when a ring structure to which $R^{31}$ is bonded is a phenyl group aromatic group), $R^{31}$ is preferably a linear alkyl group having 1 to 5 carbon atoms, a linear alkoxy group having 1 to 4 carbon atoms (or more), or an alkenyl group having 4 to 5 carbon atoms, while when a ring structure to which $R^{31}$ is bonded is a saturated ring structure such as cyclohexane, pyran, dioxane, or the like, $R^{31}$ preferably a linear alkyl group having 1 to 5 carbon atoms, a linear alkoxy group having 1 to 4 carbon atoms (or more), or a linear alkenyl group having 2 to 5 carbon atoms.

Considering good chemical stability to heat and light to be important, $R^{31}$ is preferably an alkyl group. Considering it important to form a liquid crystal display device having low viscosity and high response speed, $R^{31}$ is preferably an alkenyl group. Further, for the purpose of achieving low viscosity, a high nematic-isotropic phase transition temperature (Tni), and higher response speed, an alkenyl group without an unsaturated bond at an end is preferably used, and an alkenyl group having a methyl group as an adjacent terminal group is particularly preferred. In addition, considering good solubility at a low temperature to be important, a countermeasure is to select an alkoxy group as $R^{31}$. Another countermeasure is to combine many types of $R^{31}$. For example, it is preferred as $R^{31}$ to combine compounds having alkyl groups or alkenyl groups having 2, 3, and 4 carbon atoms, compounds having 3 and 5 carbon atoms, or compounds having 3, 4, and 5 carbon atoms.

$M^{31}$ to $M^{33}$ preferably the following.

[Chem. 5]

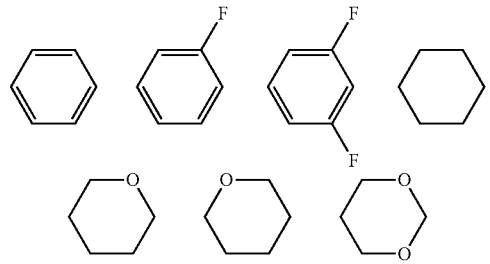

$M^{13}$ is preferably the following,

[Chem. 6]

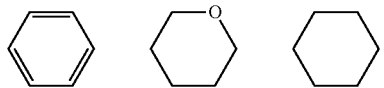

and more preferably the following.

[Chem. 7]

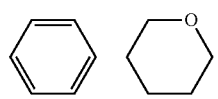

$M^{32}$ is preferably the following,

[Chem. 8]

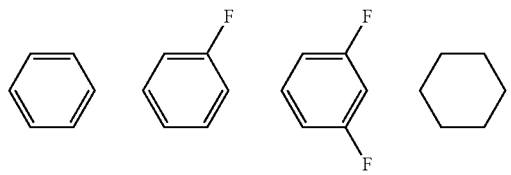

more preferably the following,

[Chem. 9]

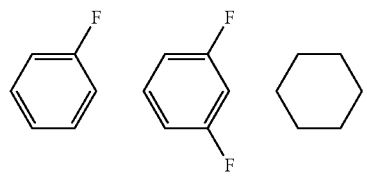

and still more preferably the following.

[Chem. 10]

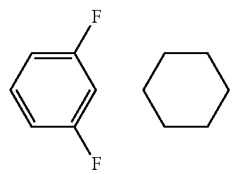

$M^{33}$ is preferably the following,

[Chem. 11]

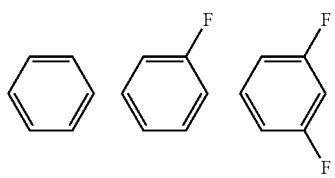

more preferably the following,

[Chem. 12]

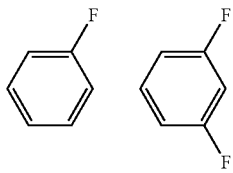

and still more preferably the following.

[Chem. 13]

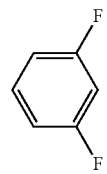

At least one of $X^{31}$ and $X^{32}$ is preferably a fluorine atom, and more preferably both are fluorine atoms.

$Z_{31}$ is preferably a fluorine atom or a trifluoromethoxy group. With respect to a combination of $X^{31}$, $X^{32}$, and $Z^{31}$, in an embodiment, $X^-=F$, $X^{32}=F$, and $Z^{31}=F$. In another embodiment $X^{31}=F$, $X^{32}=H$, and $Z^{31}=F$. In a further embodiment, $X^{31}=F$, $X^{32}=H$, and $Z^{31}=OCF_3$. In a further embodiment, $X^{31}=F$, $X^{32}=F$, and $Z^{31}=OCF_3$. In a further embodiment, $X^{31}=H$, $X^{32}=H$, and $Z^{31}=OCF_3$.

$n^{31}$ is preferably 1 or 2, $n^{32}$ is preferably 0 or 1 and more preferably 0, and $n^{31}+n^{32}$ is preferably 1 or 2 and more preferably 2.

Preferred examples of the compound represented by the general formula (I) include compounds represented by general formula (I-a) to general formula (I-f) below.

[Chem. 14]

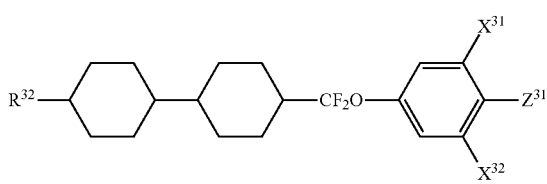
(I-a)

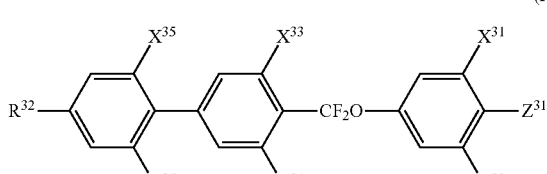
(I-b)

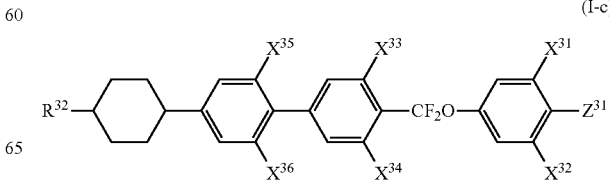
(I-c)

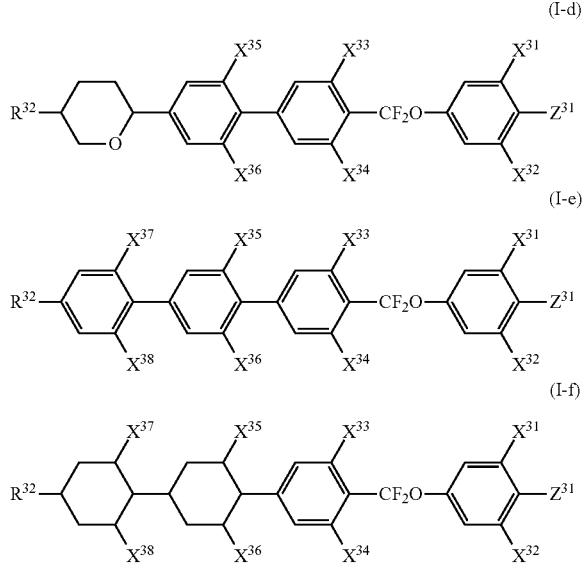

(In the formulae, $R^{32}$ represents an alkyl group having 1 to 10 carbon atoms, an alkoxy group, or an alkenyl group or alkenyloxy group having 2 to 10 carbon atom, $X^{31}$ to $X^{38}$ each independently represent a hydrogen atom or a fluorine atom, and $Z^{31}$ represents a fluorine atom, a trifluoromethoxy group, or a trifluoromethyl group.)

In the general formula (Ia) to general formula (If), when a ring structure to which $R^{32}$ bonded is a phenyl group (aromatic group), $R^{32}$ preferably a linear alkyl group having 1 to 5 carbon atoms, a linear alkoxy group having 1 to 4 carbon atoms (or more), or an alkenyl group having 4 to 5 carbon atoms, while when a ring structure to which $R^{32}$ bonded is a saturated ring structure such as cyclohexane, pyran, dioxane, or the like, $R^{32}$ preferably a linear alkyl group having 1 to 5 carbon atoms, a linear alkoxy group having 1 to 4 carbon atoms (or more), or a linear alkenyl group having 2 to 5 carbon atoms.

Considering good chemical stability to heat and light to be important, $R^{31}$ preferably an alkyl group. Considering it important to form a liquid crystal display viscosity high response speed, $R^{31}$ is preferably an alkenyl group. Further, for the purpose of achieving low viscosity, a high nematic-isotropic phase transition temperature (Tni), and higher response speed, an alkenyl group without an unsaturated bond at an end is preferably used, and an alkenyl group having a methyl group as an adjacent terminal group is particularly preferred. In addition, considering good solubility at a low temperature to be important, a countermeasure is to select an alkoxy group as $R^{31}$. Another countermeasure is to combine many types of $R^{31}$. For example, it is preferred as $R^{31}$ to combine compounds having alkyl groups or alkenyl groups having 2, 3, and 4 carbon atoms, compounds having 3 and 5 carbon atoms, or compounds having 3, 4, and 5 carbon atoms.

At least one of $X^{31}$ and $X^{32}$ preferably a fluorine atom, and more preferably both are fluorine atoms.

$Z^{31}$ preferably a fluorine atom or a trifluoromethoxy group. With respect to a combination of $X^{31}$, $X^{32}$, and $Z^{31}$, in an embodiment, $X^{31}$=F, $X^{32}$=F, and $Z^{31}$=F. In another embodiment, $X^{31}$=F, $X^{32}$=H, and $Z^{31}$=F. In a further embodiment, $X^{31}$=F, $X^{32}$=H, and $Z^{31}$=OCF$_3$. In a further embodiment, $X^{31}$=F, $X^{32}$=F, and $Z^{31}$=OCF$_3$. In a further embodiment, $X^{31}$=H, $X^{32}$=H, and $Z^{31}$=OCF$_3$.

$n^{31}$ preferably 1 or 2, $n^{32}$ preferably 0 or 1 and more preferably 0, and $n^{31}+n^{32}$ is preferably 1 or 2 and more preferably 2.

At least one of $X^{33}$ and $X^{34}$ is preferably a fluorine atom, and more preferably both are fluorine atoms.

At least one of $X^{35}$ and $X^{36}$ is preferably a fluorine atom, and $X^{35}$ and $X^{36}$ of which are fluorine atoms have the effect of increasing Δ∈ but are undesired in view of Tni, solubility at a low temperature, and chemical stability of a liquid crystal display device.

At least one of $X^{37}$ and $X^{38}$ is preferably a hydrogen atom, and preferably both are hydrogen atoms. $X^{37}$ and $X^{38}$ at least one of which is a fluorine atom are undesired in view of Tni, solubility at a low temperature, and chemical stability of a liquid crystal display device.

The compound group represented by the general formula (I) preferably includes 1 to 8 types and particularly preferably 1 to 5 types, and the content is preferably 3 to 50% by mass and more preferably 5 to 40% by mass.

In the general formula (IIa) to general formula (IIe), when a ring structure to which each of $R^{21}$ to $R^{30}$ is bonded is a phenyl group (aromatic group), $R^{21}$ to $R^{30}$ are each preferably a linear alkyl group having 1 to 5 carbon atoms, a linear alkoxy group having 1 to 4 carbon atoms (or more), or an alkenyl group having 4 to 5 carbon atoms, while when a ring structure to which each of $R^2$ to $R^{30}$ is bonded is a saturated ring structure such as cyclohexane, pyran, dioxane, or the like, $R^{21}$ to $R^{30}$ are each preferably a linear alkyl group having 1 to 5 carbon atoms, a linear alkoxy group having 1 to 4 carbon atoms (or more), or a linear alkenyl group having 2 to 5 carbon atoms.

Considering good chemical stability to heat and light to be important, $R^{21}$ to $R^{30}$ each preferably an alkyl group. Considering it important to form a liquid crystal display device having low viscosity and high response speed, $R^{21}$ to $R^{30}$ are each preferably an alkenyl group. Further, for the purpose of achieving low viscosity, a high nematic-isotropic phase transition temperature (Tni), and higher response speed, an alkenyl group without an unsaturated bond at an end is preferably used, and an alkenyl group having a methyl group as an adjacent terminal group is particularly preferred. In addition, considering good solubility at a low temperature to be important, a countermeasure is to select an alkoxy group as each of $R^{21}$ to $R^{30}$. Another countermeasure is to combine many types of $R^{21}$ to $R^{30}$. For example, it is preferred as $R^{21}$ to $R^{30}$ to combine compounds having alkyl groups or alkenyl groups having 2, 3, and 4 carbon atoms, compounds having 3 and 5 carbon atoms, or compounds having 3, 4, and 5 carbon atoms.

$R^{21}$ and $R^{22}$ are each preferably an alkyl group or an alkenyl group, and at least one of $R^{21}$ and $R^{22}$ is preferably an alkenyl group. $R^{21}$ and $R^{22}$ both of which are alkenyl groups are preferably used for increasing the response speed but are undesired for improving chemical stability of a liquid crystal display device.

At least one of $R^{23}$ and $R^{24}$ is preferably an alkyl group, an alkoxy group, or an alkenyl group having 4 to 5 carbon atoms. In order to achieve good balance between the response speed and Tni, at least one of $R^{23}$ and $R^{24}$ is preferably an alkenyl group, while in order to achieve good balance between the response speed and solubility at a low temperature, at least one of $R^{23}$ and $R^{24}$ is preferably an alkoxy group.

At least one of $R^{25}$ and $R^{26}$ is preferably an alkyl group, an alkoxy group, or an alkenyl group having 2 to 5 carbon atoms. In order to achieve good balance between the response speed and Tni, at least one of $R^{25}$ and $R^{26}$ is preferably an alkenyl group, while in order to achieve good balance between the response speed and solubility at a low temperature, at least one of $R^{25}$ and $R^{26}$ is preferably an alkoxy group. $R^{25}$ and $R^{26}$ are more preferably an alkenyl group and an alkyl group, respectively. Also, $R^{25}$ and $R^{26}$ are preferably an alkyl group and an alkoxy group, respectively.

At least one of $R^{27}$ and $R^{28}$ preferably an alkyl group, an alkoxy group, or an alkenyl group having 2 to 5 carbon atoms. In order to achieve good balance between the response speed and Tni, at least one of $R^{27}$ and $R^{28}$ is preferably an alkenyl group, while in order to achieve good balance between the response speed and solubility at a low temperature, at least one of $R^{27}$ and $R^{28}$ is preferably an alkoxy group. $R^{27}$ and $R^{28}$ are more preferably an alkyl or alkenyl group and an alkyl group, respectively. Also, $R^{27}$ and $R^{28}$ are preferably an alkyl group and an alkoxy group, respectively. Further, $R^{27}$ and $R^{28}$ are particularly preferably an alkyl group and an alkyl group, respectively.

$X^{21}$ is preferably a fluorine atom.

The compound group represented by the general formula (II-a) to general formula (II-e) preferably includes 1 to 10 types and particularly preferably 1 to 8 types, and the content is preferably 5 to 80% by mass, more preferably 10 to 70% by mass, and particularly preferably 20 to 60% by mass.

The liquid crystal composition layer in the liquid crystal display device according to the present invention can further contain at least one compound selected from the compound group represented by general formula (III-a) to general formula (III-f).

[Chem. 15]

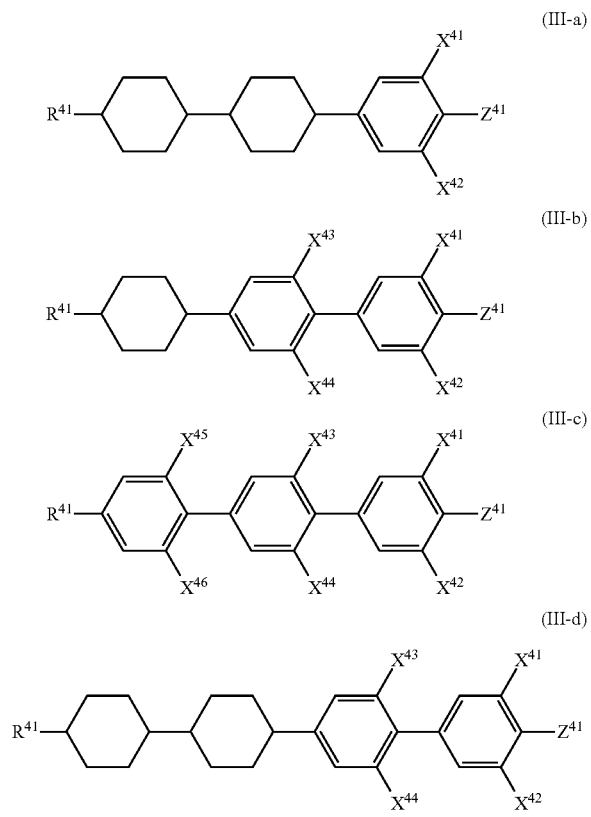
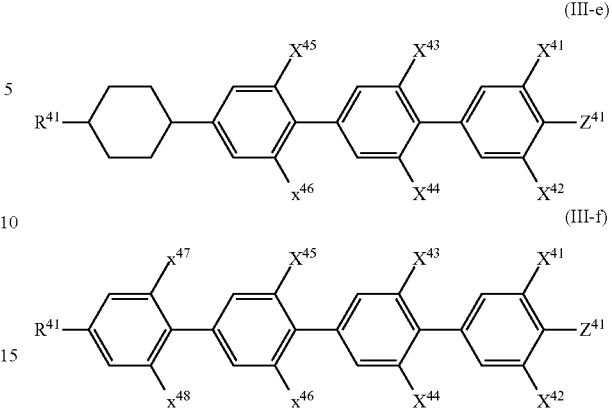

(In the formulae, $R^{41}$ represents an alkyl group having 1 to 10 carbon atoms, an alkoxy group, or an alkenyl group or alkenyloxy group having 2 to 10 carbon atoms, $X^{41}$ to $X^{48}$ each independently represent a hydrogen atom or a fluorine atom, and $Z^{41}$ represents a fluorine atom, a trifluoromethoxy group, or a trifluoromethyl group.)

In the general formula (IIIa) to general formula (IIIf), when a ring structure to which $R^{41}$ is bonded is a phenyl group (aromatic group), $R^{41}$ is preferably a linear alkyl group having 1 to 5 carbon atoms, a linear alkoxy group having 1 to 4 carbon atoms (or more), or an alkenyl group having 4 to 5 carbon atoms, while when a ring structure to which $R^{41}$ is bonded is a saturated ring structure such as cyclohexane, pyran, dioxane, or the like, $R^{41}$ is preferably a linear alkyl group having 1 to 5 carbon atoms, a linear alkoxy group having 1 to 4 carbon atoms (or more), or a linear alkenyl group having 2 to 5 carbon atoms.

Considering good chemical stability to heat and light to be important, $R^{41}$ is preferably an alkyl group. Considering it important to form a liquid crystal display device having low viscosity and high response speed, $R^{41}$ is preferably an alkenyl group. Further, for the purpose of achieving low viscosity, a high nematic-isotropic phase transition temperature (Tni), and higher response speed, an alkenyl group without an unsaturated bond at an end is preferably used, and an alkenyl group having a methyl group as an adjacent terminal group is particularly preferred. In addition, considering good solubility at a low temperature to be important, a countermeasure is to select an alkoxy group as $R^{41}$. Another countermeasure is to combine many types of $R^{41}$. For example, it is preferred as $R^{41}$ to combine compounds having alkyl groups or alkenyl groups having 2, 3, and 4 carbon atoms, compounds having 3 and 5 carbon atoms, or compounds having 3, 4, and 5 carbon atoms.

At least one of $X^{41}$ and $X^{42}$ is preferably a fluorine atom, and more preferably both are fluorine atoms.

$Z^{41}$ is preferably a fluorine atom or a trifluoromethoxy group. With respect to a combination of $X^{41}$, $X^{42}$, and $Z^{41}$, in an embodiment, $X^{41}$=F, $X^{42}$=F, and $Z^{41}$=F. In another embodiment, $X^{41}$=F, $X^{42}$=H, and $Z^{41}$=F. In a further embodiment, $X^{41}$=F, $X^{42}$=H, and $Z^{41}$=OCF$_3$. In a further embodiment, $X^{41}$=F, $X^{42}$=F, and $Z^{41}$=OCF$_3$. In a further embodiment, $X^{41}$=H, $X^{42}$=H, and $Z^{41}$=OCF$_3$.

At least one of $X^{43}$ and $X^{44}$ is preferably a fluorine atom, and more preferably both are fluorine atoms, and $X^{43}$ and $X^{44}$ both of which are fluorine atoms are preferred for achieving high $\Delta\in$ but are conversely undesired for improving solubility at a low temperature.

At least one of $X^{45}$ and $X^{46}$ is preferably a hydrogen atom, and preferably both are hydrogen atoms. The use of a large number of fluorine atoms is undesired in view of Tni, solubility at a low temperature, and chemical stability of a liquid crystal display device.

At least one of $X^{47}$ and $X^{48}$ is preferably a hydrogen atom, and preferably both are hydrogen atoms. $X^{47}$ and $X^{48}$ at least one of which is a fluorine atom are undesired in view of Tni, solubility at a low temperature, and chemical stability of a liquid crystal display device.

The compound selected from the compound group represented by the general formula (III-a) to general formula (III-f) preferably includes 1 to 10 types and particularly preferably 1 to 8 types, and the content is preferably 5 to 50% by mass and more preferably 10 to 40% by mass.

The liquid crystal composition of the liquid crystal composition layer in the liquid crystal display device according to the present invention preferably has a $\Delta\in$ at 25° C. of +3.5 or more and more preferably +3.5 to +15.0. Also, Δn at 25° C. is preferably 0.08 to 0.14 and more preferably 0.09 to 0.13. In further detail, in correspondence with a thin cell gap, Δn at 25° C. is preferably 0.10 to 0.13, while in correspondence with a thick cell gap, Δn at 25° C. is preferably 0.08 to 0.10. In addition, η at 20° C. is preferably 10 to 45 mPa·s, more preferably 10 to 25 mPa·s, and particularly preferably 10 to 20 mPa·s. Further, $T_{ni}$ is preferably 50° C. to 120° C., more preferably 70° C. to 100° C., and particularly preferably 70° C. to 85° C.

Besides the above-described compounds, the liquid crystal composition of the present invention may further contain a usual nematic liquid crystal, smectic liquid crystal, cholesteric liquid crystal, or the like.

In order to manufacture a liquid crystal display device of a PS mode or a lateral electric field-type PSA mode or lateral electric field-type PSVA mode, the liquid crystal composition of the present invention can contain at least one polymerizable compound. Usable examples of the polymerizable compound include photopolymerizable monomers which promote polymerization by energy rays such as light, and examples of a structure include those of polymerizable compounds such as biphenyl derivatives, terphenyl derivatives, and the like, which have a liquid crystal skeleton including a plurality of 6-member rings connected to each other. Preferred examples thereof include difunctional monomers represented by general formula (V),

[Chem. 16]

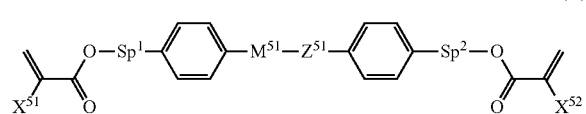

(V)

(in the formula, $X^{51}$ and $X^{52}$ independently represent a hydrogen atom or a methyl group, $Sp^1$ and $Sp^2$ each independently represent a single bond, an alkylene group having 1 to 8 carbon atoms, or —O—$(CH_2)_s$— (wherein s represents an integer of 2 to 7, and an oxygen atom is bonded to an aromatic ring), $Z^{51}$ represents —OCH$_2$—, —CH$_2$O—, —COO—, —OCO—, —CF$_2$O—, —OCF$_2$—, —CH$_2$CH$_2$—, —CF$_2$CF$_2$—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$═CY$^2$— (wherein Y$^1$ and Y$^2$ each independently represent a fluorine atom or a hydrogen atom), —C≡C—, or a single bond, $M^{51}$ represents a 1,4-phenylene group, a trans-1,4-cyclohexylene group, or a single bond, and any desired hydrogen atoms of any 1,4-phenylene group in the formula may be substituted by fluorine atoms).

Also, any one of a diacrylate derivative in which $X^{51}$ and $X^{52}$ represent hydrogen atoms and a dimethacrylate derivative in which $X^{51}$ and $X^{52}$ both represent methyl groups, and a compound in which one of $X^{51}$ and $X^{52}$ represents a hydrogen atom, and the other represents a methyl group are preferred. Among these compounds, the diacrylate derivative has the highest polymerization rate, the dimethacrylate derivative has a low polymerization rate, and the asymmetric compound has a medium polymerization rate between them. A preferred form can be used according to application. In particular, the dimethacrylate derivative is preferred for a PSA display device.

$Sp^1$ and $Sp^2$ each independently represent a single bond, an alkylene group having 1 to 8 carbon atoms, or —O—$(CH_2)_s$—, but at least one of $Sp^1$ and $Sp^2$ is preferably a single bond for a PSA display device. A preferred compound has a form in which $Sp^1$ and $Sp^2$ both represent single bonds, or one of $Sp^1$ and $Sp^2$ represents a single bond and the other represents an alkylene group having 1 to 8 carbon atoms or —O—$(CH_2)_s$—. In this case, an alkyl group having 1 to 4 carbon atoms is preferred, and s is preferably 1 to 4.

$Z^{51}$ is preferably —OCH$_2$—, —CH$_2$O—, —COO—, —OCO—, —CF$_2$O—, —OCF$_2$—, —CH$_2$CH$_2$—, —CF$_2$CF$_2$—, or a single bond, more preferably —COO—, —OCO—, or a single bond, and particularly preferably a single bond.

$M^{51}$ represents a 1,4-phenylene group in which any hydrogen atom may be substituted by a fluorine atom, a trans-1,4-cyclohexylene group, or a single bond, but a 1,4-phenylene group or a single bond is preferred. When C represents a ring structure other than a single bone, $Z^{51}$ is preferably a linkage group other than a single bond, and when $M^{51}$ a single bond, $Z^{51}$ preferably a single bond.

Specifically, in view of these points, in the general formula (V), a ring structure present between $Sp^1$ and $Sp^2$ is preferably a structure described below.

In the general formula (V), when $M^{51}$ represents a single bond, and the ring structure includes two rings, the ring structure is preferably represented by formula (Va-1) to formula (Va-5), more preferably formula (Va-1) to formula (Va-3), and particularly preferably formula (Va-1).

[Chem. 17]

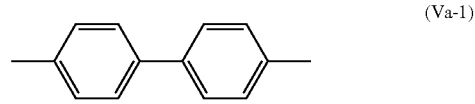

(Va-1)

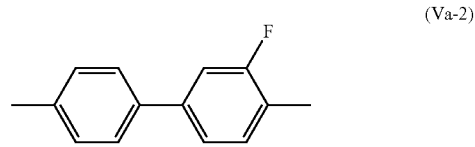

(Va-2)

-continued

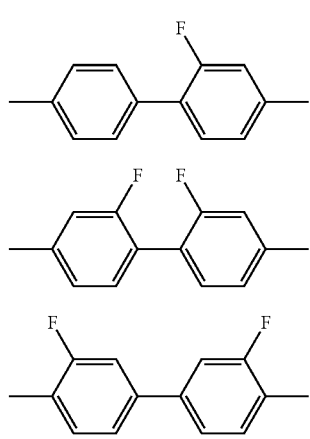

(Va-3)
(Va-4)
(Va-5)

(In the formulae, both ends are bonded to Sp$^1$ or Sp$^2$.)

The polymerizable compounds having the skeletons have, after polymerization, alignment regulating force which is optimum for a PSA-mode liquid crystal display device, and produce a good alignment state, thereby suppressing display unevenness or causing no display unevenness.

In view of the above, polymerizable compounds of general formula (V-1) to general formula (V-4) are particularly preferred, and a polymerizable compound of the general formula (V-2) is most preferred.

[Chem. 18]

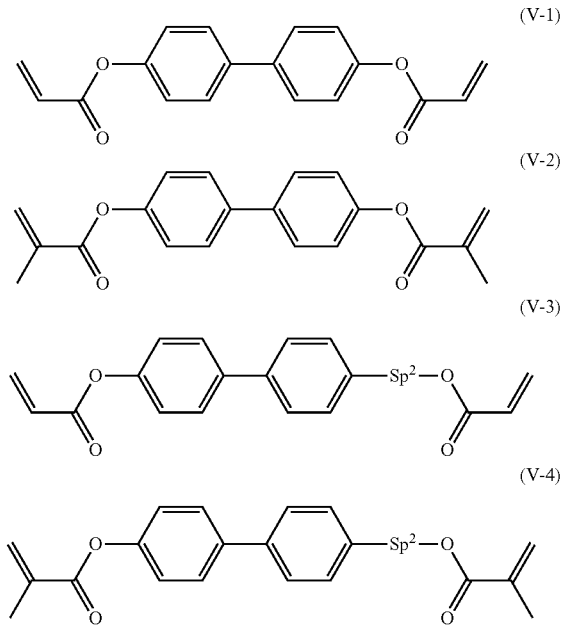

(V-1)
(V-2)
(V-3)
(V-4)

(In the formulae, Sp$^2$ represents an alkylene group having 2 to 5 carbon atoms.)

When the polymerizable compound is added to the liquid crystal composition according to the present invention, polymerization proceeds in the absence of a polymerization initiator, but a polymerization initiator may be added for promoting polymerization. Examples of the polymerization initiator include benzoin ethers, benzophenones, acetophenones, benzylketals, acylphosphine oxides, and the like.

The liquid crystal composition containing the polymerizable compound according to the present invention is imparted with a liquid crystal alignment ability when the polymerizable compound contained is polymerized by ultraviolet irradiation, and is used for a liquid crystal display device in which a quantity of transmitted light is controlled by using birefringence of the liquid crystal composition. The present invention is useful for the liquid crystal display device such as AM-LCD (active matrix liquid crystal display device), TN (nematic liquid crystal display device), STN-LCD (super twisted nematic liquid crystal display device), and OCB-LCD and IPS-LCD (in-plane switching liquid crystal display device), but the present invention is particularly useful for AM-LCD and can be used for a transmissive or reflective liquid crystal display device.

(Color Filter)

A color filter according to the present invention includes a black matrix and at least RGB three-color pixel portions, the RGB three-color pixel portions including, as colorants, a diketopyrrolopyrrole pigment and/or anionic red organic dye in a R pixel portion, at least one selected from the group consisting of a halogenated copper phthalocyanine pigment, a phthalocyanine green dye, and a mixture of a phthalocyanine blue dye and an azo yellow organic dye in a G pixel portion, and a ∈-type copper phthalocyanine pigment and/or cationic blue organic dye in a B pixel portion.

The RGB three-color pixel portions preferably include, as a colorant, C. I. Solvent Red 124 or C. I. Pigment Red 254 in the R pixel portion.

The RGB three-color pixel portions preferably include, as a colorant, a mixture of C. I. Solvent Blue 67 and C. I. Solvent Yellow 162 or C. I. Pigment Green 7 and/or 36 in the G pixel portion.

The RGB three-color pixel portions preferably include, as a colorant, C. I. Solvent Blue 7 or C. I. Pigment Blue 15:6 in the B pixel portion.

The RGB three-color pixel portions preferably include, as colorants, C. I. Solvent Red 124 in the R pixel portion, a mixture of C. I. Solvent Blue 67 and C. I. Solvent Yellow 162 in the G pixel portion, and C. I. Solvent Blue 7 in the B pixel portion.

Also, the RGB three-color pixel portions preferably include, as colorants, C. I. Pigment Red 254 in the R pixel portion, C. I. Pigment Green 7 and/or 36 in the G pixel portion, and C. I. Pigment Blue 15:6 in the B pixel portion.

The RGB three-color pixel portions preferably further include, as a colorant in the R pixel portion, at least one organic dye/pigment selected from the group consisting of C. I. Pigment Red 177, 242, 166, 167, and 179, C. I. Pigment Orange 38 and 71, C. I. Pigment Yellow 150, 215, 185, 130, and 139, C. I. Solvent Red 89, C. I. Solvent Orange 56, and C. I. Solvent Yellow 21, 82, 83:1, 33, and 162.

The RGB three-color pixel portions preferably include, as a colorant in the G pixel portion, at least one organic dye/pigment selected from the group consisting of C. I. Pigment Yellow 150, 215, 185, and 138, and C. I. Solvent Yellow 21, 82, 83:1, and 33.

The RGB three-color pixel portions preferably further include, as a colorant in the B pixel portion, at least one organic dye/pigment selected from the group consisting of C. I. Pigment Blue 1, C. I. Pigment Violet 23, C. I. Basic Blue 7, C. I. Basic Violet 10, C. I. Acid Blue 1, 90, and 83, and C. I. Direct Blue 86.

A color filter includes a black matrix, RGB three-color pixel portions, and a Y pixel portion, and preferably contains, as a colorant in the Y pixel portion, at least one yellow organic dye/pigment selected from the group consisting of C. I. Pigment Yellow 150, 215, 185, 138, and 139, and C. I. Solvent Yellow 21, 82, 83:1, 33, and 162.

From the viewpoint of preventing a decrease in voltage holding ratio (VHR) of the liquid crystal layer an increase in ion density (ID) and suppressing the occurrence of the problems of display defects such as white spots, alignment unevenness, image sticking, and the like, each of the pixel portions in the color filter according to the present invention preferably has chromaticity x and chromaticity y in the XYZ color coordinate system under a C light source as described below.

The R pixel portion preferably has, in the XYZ color coordinate system under the C light source, a chromaticity x of 0.58 to 0.69 and more preferably 0.62 to 0.68, and a chromaticity y of 0.3.0 to 0.36 and more preferably 0.31 to 0.35. Preferably, the chromaticity x is 0.58 to 0.69 and the chromaticity y is 0.30 to 0.36, and more preferably, the chromaticity x is 0.62 to 0.68 and the chromaticity y is 0.31 to 0.35.

The G pixel portion preferably has, in the XYZ color coordinate system under the C light source, a chromaticity x of 0.19 to 0.35 and more preferably 0.20 to 0.26, and a chromaticity y of 0.54 to 0.74 and more preferably 0.64 to 0.73. Preferably, the chromaticity x is 0.19 to 0.35 and the chromaticity y is 0.54 to 0.74, and more preferably, the chromaticity x is 0.20 to 0.26 and the chromaticity y is 0.64 to 0.73.

The B pixel portion preferably has, in the XYZ color coordinate system under the C light source, a chromaticity x of 0.11 to 0.16 and more preferably 0.12 to 0.15, and a chromaticity y of 0.04 to 0.15 and more preferably 0.05 to 0.10. Preferably, the chromaticity x is 0.11 to 0.16 and the chromaticity y is 0.04 to 0.15, and more preferably, the chromaticity x is 0.12 to 0.15 and the chromaticity y is 0.05 to 0.10.

The Y pixel portion preferably has, in the XYZ color coordinate system under the C light source, a chromaticity x of 0.46 to 0.50 and more preferably 0.47 to 0.48, and a chromaticity y of 0.48 to 0.53 and more preferably 0.50 to 0.52. Preferably, the chromaticity x is 0.46 to 0.50 and the chromaticity y is 0.48 to 0.53, and more preferably, the chromaticity x is 0.47 to 0.48 and the chromaticity y is 0.50 to 0.52.

Here, the XYZ color coordinate system is a color coordinate system approved as a standard color coordinate system by CIE (International Commission on Illumination) in 1931.

The chromaticity of each of the pixel portions can be adjusted by changing the type of the dye/pigment used and a mixing ratio thereof. For example, the chromaticity in a R pixel can be adjusted by adding a proper amount of yellow dye/pigment and/or orange pigment to a red dye/pigment, the chromaticity in a G pixel can be adjusted by adding a proper amount of yellow dye/pigment to a green dye/pigment, and the chromaticity in a B pixel can be adjusted by adding a proper amount of violet dye/pigment to a blue dye/pigment. Also, the chromaticity can be adjusted by appropriately adjusting the particle diameter of a pigment.

In the color filter, the color filter pixel portions can be formed by a generally known method. A typical method for forming pixel portions is a photolithography method in which a photocurable composition described below is applied to a surface of a color filter transparent substrate on the side provided with a black matrix and then dried by heating (prebaked), the photocurable compound is cured in portions corresponding to the pixel portions by pattern exposure under irradiation with ultraviolet light through a photomask, unexposed portions are developed with a developer, and then non-pixel portions are removed to fix the pixel portions to the transparent substrate. This method forms the pixel portions each composed of a cured color film of the photocurable composition on the transparent substrate.

A photocurable composition described below is prepared for each of R pixels, G pixels, B pixels, and it required, other color pixels such as Y pixels or the like, and the above-described operation is repeated to produce a color filter having color pixel portions of the R pixels, G pixels, B pixels, and Y pixels at predetermined positions.

Examples of a method for applying each photocurable composition described below to the transparent substrate of glass or the like include a spin coating method, a roll coating method, an ink let method, and the like.

The drying conditions of a coating film of the photocurable composition applied to the transparent substrate are generally 50° C. to 150° C. and about 1 to 15 minutes, depending on the type and mixing ratio of each component, or the like. Light used for photocuring the photocurable composition is preferably ultraviolet light within a wavelength region of 200 to 500 nm or visible light. Various light sources which emit light within this wavelength region can be used.

Examples of a development method include a puddle method, a dipping method, a spray method, and the like. After exposure and development of the photocurable composition, the transparent substrate on which necessary color pixel portions have been formed is washed with water and dried. The resultant color filter is heat-treated (post baked) at 90° C. to 200° C. for a predetermined time using a heating apparatus such as a hot plate, an oven, or the like to remove volatile components in the color coating film and, at the same time, to heat-cure an unreacted photocurable compound remaining in the cured color coating film of the photocurable composition, completing the color filter. Also, a color filter-on-array structure including a color filter formed on a pixel substrate can be formed.

By using the colorants for the color filter of the present invention in combination with the liquid crystal composition of the present invention, it is possible to provide a liquid crystal display device capable of preventing a decrease in voltage holding ratio (VHR) of the liquid crystal layer and an increase in ion density (ID) and resolving the problem of display defects such as white spots, alignment unevenness, image sticking, and the like.

A method for producing the photocurable composition is generally a method in which a dye and/or pigment composition for the color filter of the present invention, an organic solvent, and a dispersant are used as essential components, these components are mixed and uniformly dispersed by stirring to prepare a pigment dispersion for forming a pixel portion of the color filter, and a photocurable compound and, if required, a thermoplastic resin, a photopolymerization initiator, and the like are added to the dispersion to produce the photocurable composition.

Examples of the organic solvent used include aromatic solvents such as toluene, xylene, methoxybenzene, and the like; acetic acid ester solvents such as ethyl acetate, propyl acetate, butyl acetate, propylene glycol monomethyl ether acetate, propylene glycol monoethyl ether acetate, diethylene glycol methyl ether acetate, diethylene glycol ethyl ether acetate, diethylene glycol propyl ether acetate, diethylene glycol butyl ether acetate, and the like; propionate solvents such as ethoxyethyl propionate, and the like; alcohol solvents such as methanol, ethanol, and the like; ether solvents such as butyl cellosolve, propylene glycol monomethyl ether, diethylene glycol ethyl ether, diethylene glycol dimethyl ether, and the like; ketone solvents such as methyl ethyl ketone, methyl isobutyl ketone, cyclohexanone, and the like; aliphatic hydrocarbon solvents such as hexane and the like; nitrogen compound solvents such as N,N-dimethylformamide, γ-butyrolactam, N-methyl-2-pyrrolidone, aniline, pyridine, and the like; lactone solvents such as γ-butyrolactone and the like; and carbamic acid esters such as a mixture of methyl carbamate and ethyl carbamate at 48:52, and the like.

Examples of the dispersant which can be used include dispersants such as BYK Chemie DISPERBYK 130, DISPERBYK 161, DISPERBYK 162, DISPERBYK 163, DISPERBYK 170, DISPERBYK 171, DISPERBYK 174, DISPERBYK 180, DISPERBYK 182, DISPERBYK 183, DISPERBYK 184, DISPERBYK 185, DISPERBYK 2000, DISPERBYK 2001, DISPERBYK 2020, DISPERBYK 2050, DISPERBYK 2070, DISPERBYK 2096, DISPERBYK 2150, DISPERBYK LPN21116, and DISPERBYK LPN6919; Efka Chemicals Company Efka 46, Efka 47, Efka 452, Efka LP4008, Efka 4009, Efka LP4010, Efka LP4050 and LP4055, Efka 400, Efka 401, Efka 402, Efka. 403, Efka 450, Efka 451, Efka 453, Efka 4540, Efka 4550, Efka LP4560, Efka 120, Efka 150, Efka 1501, Efka 1502, and Efka 1503; Lubrizol Corporation Solsperse 3000, Solsperse 9000, Solsperse 13240, Solsperse 13650, Solsperse 13940, Solsperse 17000 and 18000, Solsperse 20000, Solsperse 21000, Solsperse 20000, Solsperse 24000, Solsperse 26000, Solsperse 27000, Solsperse 20000, Solsperse 32000, Solsperse 35000, Solsperse 37000, Solsperse 32000, Solsperse 41000, Solsperse 42000, Solsperse 43000, Solsperse 46000, Solsperse 54000, and Solsperse 71000; and Ajimonoto Co., Ltd. Ajisper PB711, Ajisper PE821, Ajisper PB922, Ajisber PB814, Ajisper PN411, and Ajisper PA111; and synthetic resins which are liquid at room temperature and water-insoluble, such as acryl resins, urethane resins, alkyd resins, natural rosins such as wood rosin, gum rosin, tall oil rosin, and the like, modified rosins such as polymerized rosin, disproportionated rosin, hydrogenated rosin, oxidized rosin, maleinized rosin, and the like, rosin derivatives such as rosin amine, lime rosin, rosin alkyleneoxide adduct, rosin alkyd adduct, rosin-modified phenol, and the like. Addition of any one of the dispersants and resins contributes to a decrease in flocculation and improvements in dispersion stability of pigments and viscosity characteristics of the dispersant.

Examples of a dispersion aid which can be used include organic pigment derivatives such as phthalimide methyl derivatives, sulfonic acid derivatives, N-(dialkylamino)methyl derivative, N-(dialkylaminoalkyl)sulfonic amide derivatives, and the like. Of course, these derivatives can be used in combination of two or more different types.

Examples of the thermoplastic resin used for preparing the photocurable composition include urethane resins, acryl resins, polyamide resins, polyimide resins, styrene-maleic acid resins, styrene-maleic anhydride resins, and the like.

Examples of the photocurable compound include difunctional monomers such as 1,6-hexanediol diacrylate, ethylene glycol diacrylate, neopentyl glycol diacrylate, triethylene glycol diacrylate, bis(acryloxyethoxy)bisphenol A, 3-methylpentanediol diacrylate, and the like; polyfunctional monomers with relatively low molecular weight, such as trimethylolpropane triacrylate, pentaerythritol triacrylate, tris[2-(meth)acryloyloxyethyl)isocyanurate, dipentaerythritol hexaacrylate, dipentaerythritol pentaacrylate, and the like; and polyfunctional monomers with relatively high molecular weight, such as polyester acrylate, polyurethane acrylate, polyether acrylate, and the like.

Examples of the photopolymerization initiator include acetophenone, benzophenone, benzyl dimethyl ketal, benzoyl peroxide, 2-chlorothioxanthone, 1,3-bis(4'-azidobenzal)-2-propane, 1,3-bis(4'-azidobenzal)-2-propane-2'-sulfonic acid, 4,4'-diazidostilbene-2,2'-disulfonic acid, and the like. Examples of a commercially available, photopolymerization initiator include BASF Corporation "Irgacure (trade name)—184", "Irgacure (trade name)—369", "Darocur (trade name)—1173", and BASF Corporation "Lucirin-TPO", Nippon Kayaku Co., Ltd. "Kayacure (trade name) DETX" and "Kavacure (trade name) OA", Sutoufa Chemical Co., "Baikyua 10" and "Baikyua 55", and Akzo Co., Ltd. "Trigonal PI", Sandozu Co., Ltd. "Sandorei 1000", Apulon Co., Ltd. "Deep", Kurogane Kasei Co., Ltd. "Biimidazole", and the like.

The photopolymerization initiator can be combined with a known photosensitizer in common use. Examples of the photosensitizer include amines, ureas, sulfur atom-containing compounds, phosphorus atom-containing compounds, chlorine atom-containing compounds, nitriles, other nitrogen atom-containing compounds, and the like. These can be used alone or in combination of two or more.

The ratio of the photopolymerization initiator mixed is not particularly limited but is preferably in a range of 0.1% to 30% on a mass basis relative to a compound having a photopolymerizable or photocurable functional group. With the ratio less than 0.1%, sensitivity during curing tends to be decreased, while with the ratio exceeding 30%, crystals of the photopolymerization initiator may be precipitated when a coating film of a pigment-dispersed resist is dried, thereby causing deterioration in the physical properties of the coating film.

By using each of the above-described materials, on a mass basis, 300 to 1000 parts of the organic solvent and 1 to 100 parts of the dispersant relative to 100 parts of the color filter dye and/or pigment composition of the present invention are uniformly dispersed by stirring to prepare the dye/pigment solution. Then, to the pigment dispersion, the thermoplastic resin and the photocurable compound in a total of 3 to 20 parts per part of the pigment composition for the color filter of the present invention, 0.05 to 3 parts of the photopolymerization initiator per part of the photocurable compound, and if required, the organic solvent are added and uniformly dispersed by stirring to produce the photocurable composition for forming each of the color filter pixel portions.

A known organic solvent or aqueous alkali solution in common use can be used as the developer. In particular, when the photocurable composition contains the thermoplastic resin or the photocurable compound at least one of which has an acid value and exhibits alkali solubility, washing with an aqueous alkali solution is effective for forming the color filter pixel portions.

Although the method for producing the color filter pixel portions by the photolithography method is described in detail, each of the color filter pixel portions prepared by using the color filter pigment composition of the present invention may be formed by another method such as an electrodeposition method, a transfer method, a micelle electrolysis method, a PVED (Photovoltaic Electrodeposition) method, an ink jet method, a reverse printing method, a heat curing method, or the like, thereby producing the color filter.

(Alignment Film)

In the liquid crystal display device of the present invention, when the alignment film for aligning the liquid crystal composition is required to be provided on the surface of each of the first and second substrates which is in contact with the liquid crystal composition, the alignment film is disposed between the color filter and the liquid crystal layer. However, even in the case of a thick film, the alignment film has a thickness of as small as 100 nm or less so as not to completely cut off the interaction between the colorants such as pigments or the like, which constitute the color filter, and the liquid crystal compound constituting the liquid crystal layer.

The liquid crystal display device without using the alignment film has greater interaction between the colorants such as pigments or the like, which constitute the color filter, and the liquid crystal compound constituting the liquid crystal layer.

Usable examples of an alignment film material include transparent organic materials such as polyimide, polyamide, BCB (benzocyclobutene polymer), polyvinyl alcohol, and the like. In particular, it is preferred to use a polyimide alignment film produced by imidizing a polyamic-acid synthesized from diamine such as an aliphatic or alicyclic diamine, for example, p-phenylenediamine, 4,4'-diaminodiphenylmethane, or the like, and an aliphatic or alicyclic tetracarboxylic anhydride, such as butanetetracarboxylic anhydride, 2,3,5-tricarboxycyclopentylacetic anhydride, or the like, or an aromatic tetracarboxylic anhydride such as pyromellitic dianhydride or the like. In this case, rubbing is generally used as an alignment imparting method, but when the alignment film is used as a vertical alignment film, it can be used without imparting alignment.

A material containing a compound containing chalcone, cinnamate, cinnamoyl, or an azo group can be used as the alignment film material, and this may be used in combination with a material such as polyimide, polyamide, or the like. For this alignment film, rubbing may be used or a light alignment technique may be used.

The alignment film is generally formed as a resin film by applying the alignment film material to the substrate using a method such as a spin coating method or the like, but a uniaxial stretching method, a Langmuir-Blodgett method, or the like can also be used.

(Transparent Electrode)

In the liquid crystal display device of the present invention, a conductive metal oxide can be used as a material of the transparent electrode. Usable examples of the metal oxide include indium oxide ($In_2O_3$), tin oxide ($SnO_2$), zinc, oxide (ZnO), indium-tin oxide ($In_2O_3$—$SnO_2$), indium-zinc oxide ($In_2O_3$—ZnO), niobium-added titanium dioxide ($Ti_{1-x}Nb_xO_2$) fluorine-doped tin oxide, graphene nanoribbons or metal nanowires, and the like. But zinc oxide (ZnO), indium-tin oxide ($In_2O_3$—$SnO_2$), or indium-zinc oxide ($In_2O_3$—ZnO) is preferred. The transparent conductive film can be patterned by a method such as a photo-etching method, a method using a mask, or the like.

The liquid crystal display device of the present invention is particularly useful for a liquid crystal display device for active matrix driving and can be applied to a liquid crystal display device for a TN mode, an IPS mode, a polymer-stabilized IPS mode, a FES mode, an OCB mode, a VA mode, or an ECB mode.

EXAMPLES

The present invention is described in further detail below by way of examples, but the present invention is not limited to these examples. In the examples and comparative examples below, "%" in a composition represents "% by mass".

In the examples, characteristics measured are as follows.

$T_{ni}$: nematic-isotropic liquid phase transition temperature (C)

Δn: refractive index anisotropy at 25° C.

Δε: dielectric constant anisotropy at 25° C.

η: viscosity at 20° C. (mPa·s)

γ1: rotational viscosity at 25° C. (mPa·s)

VHR: voltage holding ratio at 70° C. (%)

(a value by % representing a ratio of a measured voltage to an initial applied voltage, the measured voltage being measured using a liquid crystal composition injected into a cell having a cell thickness of 3.5 μm under the conditions of 5 V applied, a frame time of 200 ms, and a pulse width of 64 μs)

ID: ion density at 70° C. ($pC/cm^2$)

(a value of ion density measured using a liquid crystal composition injected into a cell having a cell thickness of 3.5 μm and MTR-1 (manufactured by Toyo Corporation) under the conditions of 20 V applied and a frequency of 0.05 Hz)

Image Sticking:

Image sticking of the liquid crystal display device was evaluated by display of a predetermined fixed pattern within a display area for 1000 hours and then uniform display over the entire screen to visually observe the level of residual image of the fixed pattern based on the following 4 levels:

A: No residual image

B: Slight residual image at an allowable level

C: Residual image at an unallowable level

D: Significant residual image

In the examples, compounds are represented by abbreviations below.

(Ring Structure)

[Chem. 19]

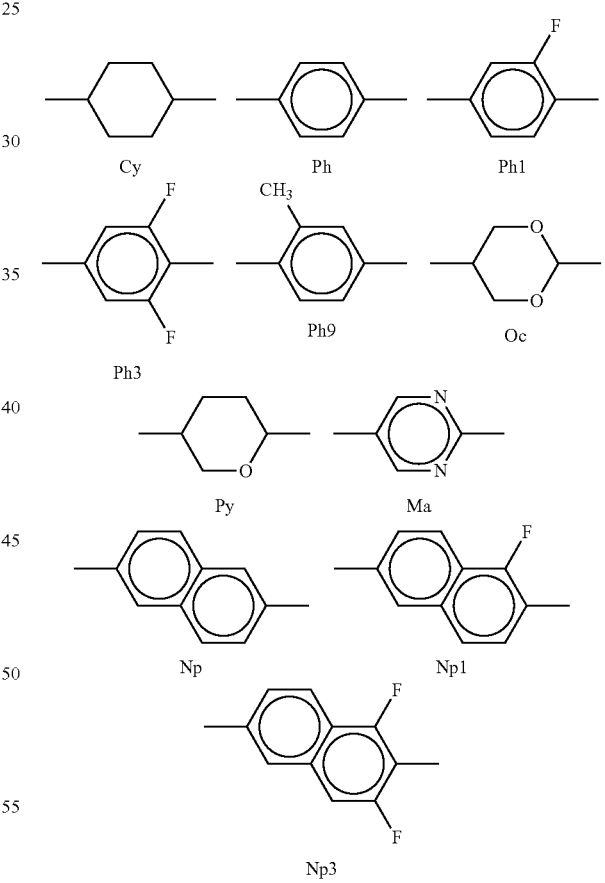

(Side-Chain Structure and Linkage Structure)

TABLE 1

| n (number) at end | $C_nH_{2n+1}$— |
|---|---|
| -2- | —$CH_2CH_2$— |
| —1O— | —$CH_2O$— |
| —O1— | —$OCH_2$— |

TABLE 1-continued

| | |
|---|---|
| —V— | —CO— |
| —VO— | —COO— |
| —CFFO— | —CF$_2$O— |
| —F | —F |
| —Cl | —Cl |
| —CN | —C≡N |
| —OCFFF | —OCF$_3$ |
| —CFFF | —CF$_3$ |
| —On | —OC$_n$H$_{2n+1}$— |
| -T- | —C≡C— |
| —N— | —CH=N—N=CH— |
| ndm- | C$_n$H$_{2n+1}$—HC=CH—(CH$_2$)$_{m-1}$— |
| -ndm | —(CH$_2$)$_{n-1}$—HC=CH—C$_m$H$_{2m+1}$ |
| ndmO— | C$_n$H$_{2n+1}$—HC=CH—(CH$_2$)$_{m-1}$O— |
| —Ondm | —O—(CH$_2$)$_{n-1}$—HC=CH—C$_m$H$_{2m+1}$ |
| -ndm- | —(CH$_2$)$_{n-1}$—HC=CH—(CH$_2$)$_{m-1}$— |

[Formation of Color Filter]
[Preparation of Colored Composition]
[Red Dye-Colored Composition 1]

In a polymer bottle, 10 parts of red dye 1 (C. I. Solvent Red 124) was placed, and 55 parts of propylene glycol monomethyl ether acetate and SEPR beads of 0.3 to 0.4 mm in diameter were added, and the resultant mixture was dispersed with a paint conditioner (manufactured by Toyo Seiki Co., Ltd.) for 4 hours and then filtered through a 5 μm filter to produce a dye-colored solution. Then, 75.00 parts of the dye colored solution, 5.50 parts of polyester acrylate resin (Aronix (trade name) M7100 manufactured by Toa Gosei Chemical Industry Co., Ltd.), 5.00 parts of dipentaerythritol hexaacrylate (KAYARAD (trade name) DPHA, manufactured by Nippon Kayaku Co., Ltd.), 1.00 part of benzophenone (KAYACURE (trade name) BP-100, manufactured by Nippon Kayaku Co., Ltd.), and 13.5 parts of Ucar Ester EEP were stirred with a dispersion stirrer and then filtered with a filter having a pore size of 1.0 μm to produce red dye-colored composition 1.

[Red Dye Colored Composition 2]

Red dye colored composition 2 was produced by the same method as described above using 8 parts of red dye 1 (C. I. Solvent Red 124) and 2 parts of yellow dye 2 (C. I. Solvent Yellow 21) in place of 10 parts of the red dye 1 of the red dye colored composition 1.

[Red Dye Colored Composition 3]

Red dye colored composition 3 was produced by the same method as described above using 10 parts of red dye 2 (C. I. Solvent Red 1) in place of 10 parts of the red dye 1 of the red dye colored composition 1.

[Green Dye Colored Composition 1]

Green dye colored composition 1 was produced by the same method as described above using 3 parts of blue dye 1 (C. I. Solvent Blue 67) and 7 parts of yellow dye 1 (C. I. Solvent Yellow 162) in place of 10 parts of the red dye 1 of the red dye colored composition 1.

[Green Dye Colored Composition 2]

Green dye colored composition 2 was produced by the same method as described above using 4 parts of yellow dye 1 (C. I. Solvent Yellow 162) and 3 parts of yellow dye 3 (C. I. Solvent Yellow 82) in place of 7 parts of the yellow dye 1 of the green dye colored composition 1.

[Green Dye Colored Composition 3]

Green dye colored composition 3 was produced by the same method as described above using 10 parts of green dye 1 (C. I. Solvent Green 7) in place of 3 parts of the blue dye 1 and 7 parts of the yellow dye 1 of the green dye colored composition 1.

[Blue Dye Colored Composition 1]

Blue dye colored composition 1 was produced by the same method as described above using 10 parts of blue dye 1 (C. I. Solvent Blue 7) in place of 10 parts of the red dye 1 of the red dye colored composition 1.

[Blue Dye Colored Composition 2]

Blue dye colored composition 2 was produced by the same method as described above using 7 parts of blue dye 1 (C. I. Solvent Blue 7) and 3 parts of violet dye 1 (C. I. Basic Violet 10) in place of 10 parts of the blue dye 1 of the blue dye colored composition 1.

[Blue Dye Colored Composition 3]

Blue dye colored composition 3 was produced by the same method as described above using 10 parts of blue dye 2 (C. I. Solvent Blue 12) in place of 7 parts of the blue dye 1 and 3 parts of the violet dye 1 of the blue dye colored composition 2.

[Yellow Dye Colored Composition 1]

Yellow dye colored composition 1 was produced by the same method as described above using 10 parts of yellow dye 2 (C. I. Solvent Yellow 21) in place of 10 parts of the red dye 1 of the red dye colored composition 1.

[Yellow Dye Colored Composition 2]

Yellow dye colored composition 2 was produced by the same method as described above using 10 parts of yellow dye 4 (C. I. Solvent Yellow 2) in place of 10 parts of the yellow dye 2 of the yellow dye colored composition 1.

[Red Pigment Colored Composition 1]

In a polymer bottle, 10 parts of red pigment 1 (C. I. Pigment Red 254, "IRGAPHOR RED BT-CF" manufactured by BASF Corporation) was placed, and 55 parts of propylene glycol monomethyl ether acetate, 7.0 parts of DISPERBYK LPN21116 (manufactured by BYK Chemie Corporation), and SEPR beads of 0.3 to 0.4 mm in diameter were added, and the resultant mixture was dispersed with a paint conditioner (manufactured by Toyo Seiki Co., Ltd.) for 4 hours and then filtered with a 5 μm filter to produce a pigment-colored solution. Then, 75.00 parts of the pigment-colored solution, 5.50 parts by polyester acrylate resin (Aronix (trade name) M7100 manufactured by Toa Gosei Chemical Industry Co., Ltd.), 5.00 parts of dipentaerythritol hexaacrylate (KAYARAD (trade name) DPHA, manufactured by Nippon Kayaku Co., Ltd.), 1.00 part of benzophenone (KAYACURE (trade name) BP-100, manufactured by Nippon Kayaku Co., Ltd.), and 13.5 parts of Ucar Ester EEP were stirred with a dispersion stirrer and then filtered with a filter having a pore size of 1.0 μm to produce red pigment colored composition 1.

[Red Pigment Colored Composition 2]

Red pigment colored composition 2 was produced by the same method as described above using 6 parts of the red pigment 1, 2 parts of red pigment 2 (C. I. Pigment Red 177 manufactured by DIC Corporation, FASTOGEN SUPER RED ATY-TR), and 2 parts of yellow pigment 2 (C. I. Pigment Yellow 139) in place of 10 parts of the red pigment 1 of the red pigment colored composition 1.

[Green Pigment Colored Composition 1]

Green pigment colored composition 1 was produced by the same method as described above using 6 parts of green pigment 1 (C. I. Pigment Green 36, manufactured by DIC Corporation, "FASTOGEN GREEN 2YK-CF"), and 4 parts of yellow pigment 1 (C. I. Pigment Yellow 150, manufactured by BAYER Corporation, FANCHON FAST YELLOW E4GN) in place of 10 parts of the red pigment 1 of the red pigment colored composition 1.

[Green Pigment Colored Composition 2]

Green pigment colored composition 2 was produced by the same method as described above using 4 parts of green pigment 2 (C. I. Pigment Green 7, manufactured by DIC Corporation, FASTOGEN GREEN S) and 6 parts of yellow pigment 3 (C. I. Pigment Yellow 138) in place of 6 parts of the green pigment 1 and 4 parts of the yellow pigment 1 of the green pigment colored composition 1.

[Blue Pigment Colored Composition 1]

Blue pigment colored composition 1 was produced by the same method as described above using 9 parts of blue pigment 1 (C. I. Pigment Blue 15:6, manufactured by DIC Corporation, "FASTOGEN BLUE EP-210") and 1 part of violet pigment 1 (C. I. Pigment Violet 23) in place of 10 parts of the red pigment 1 of the red pigment colored composition 1.

[Blue Pigment Colored Composition 2]

Blue pigment colored composition 2 was produced by the same method as described above using 1 part of violet pigment 1 (C. I. Basic Violet 10) in place of 1 part of the violet pigment 1 of the blue pigment colored composition 1.

[Yellow Pigment Colored Composition 1]

Yellow pigment colored composition 1 was produced by the same method as described above using 10 parts of yellow pigment 1 (C. I. Pigment Yellow 15, manufactured by BAYER Corporation, FANCHON FAST YELLOW E4GN) in place of 10 parts of the red pigment 1 of the red pigment colored composition 1.

[Formation of Color Filter]

The red colored composition was applied to a thickness of 2 μm by spin coating on a glass substrate on which a black matrix had been previously formed. After drying at 70° C. for 20 minutes, stripe-shaped pattern exposure was performed with ultraviolet light through a photomask using an exposure apparatus provided with a super-high pressure mercury lamp. Then, spray development with an alkali developer for 90 seconds, washing with ion exchange water, and air drying were performed. Further, post baking was performed in a clean oven at 230° C. for 30 minutes to form red pixels as a stripe-shaped color layer on the transparent substrate.

Next, similarly, the green colored composition was applied to a thickness of 2 μm by spin coating. After drying, a stripe-shaped color layer was formed in a position deviated from the red pixels by exposure with an exposure apparatus and development, thereby forming greed pixels adjacent to the red pixels.

Next, similarly, the blue colored composition was applied to a thickness of 2 μm by spin coating, forming yellow pixels adjacent to the red pixels the greed pixels and the blue pixels. As a result, a color filter having stripe-shaped pixels of the three colors of red, green, and blue was produced.

If required, similarly, the yellow colored composition was applied to a thickness of 2 μm by spin coating, forming blue pixels adjacent to the red pixels and the greed pixels. As a result, a color filter having stripe-shaped pixels of the four colors of red, green, blue, and yellow was produced.

Color filters 1 to 4 and comparative color filter 1 were formed by using the dye colored compositions or pigment colored compositions shown in Table 2.

TABLE 2

|  | Color filter 1 | Color filter 2 | Color filter 3 | Color filter 4 | Comparative Color filter 1 |
|---|---|---|---|---|---|
| R pixel portion | Red dye colored composition 1 | Red dye colored composition 2 | Red pigment colored composition 1 | Red pigment colored composition 2 | Red dye colored composition 3 |
| G pixel portion | Green dye colored composition 1 | Green dye colored composition 2 | Green pigment colored composition 1 | Green pigment colored composition 2 | Green dye colored composition 3 |
| B pixel portion | Blue dye colored composition 1 | Blue dye colored composition 2 | Blue pigment colored composition 1 | Blue pigment colored composition 2 | Blue dye colored composition 3 |
| Y pixel portion | No | Yellow dye colored composition 1 | No | Yellow pigment colored composition 1 | Yellow dye colored composition 2 |

Each of the pixels of the color filters was measured with respect to x value and y value in the CIE 1931 XYZ color coordinate system under a C light source using a microspectrophotometric apparatus including microscope MX-50 manufactured by Olympus Optical Co., Ltd. and spectrophotometer MCPD-3000 manufactured by Otsuka. Electronics Co., Ltd. The results are shown in Table 3 below.

TABLE 3

|  | Color filter 1 (x, y) | Color filter 2 (x, y) | Color filter 3 (x, y) | Color filter 4 (x, y) | Comparative color filter (x, y) |
|---|---|---|---|---|---|
| R pixel portion | (0.63, 0.29) | (0.62, 0.31) | (0.62, 0.32) | (0.63, 0.33) | (0.59, 0.30) |
| G pixel portion | (0.26, 0.68) | (0.27, 0.69) | (0.24, 0.67) | (0.22, 0.65) | (0.20, 0.55) |
| B pixel portion | (0.17, 0.10) | (0.13, 0.14) | (0.14, 0.10) | (0.15, 0.07) | (0.14, 0.15) |
| Y pixel portion |  | (0.47, 0.51) |  | (0.48, 0.50) | (0.49, 0.48) |

Examples 1 to 4

An electrode structure was formed on at least one of first and second substrates, and a horizontal alignment-type alignment film was formed on each of the facing surfaces of the substrates and weakly rubbed to form an IPS cell. Then, liquid crystal composition 1 described below was held between the first substrate and the second substrate. Table 4 shows the physical property values of the liquid crystal composition 1. Next, liquid crystal display devices of Examples 1 to 4 were formed by using the color filters 1 to 4 shown in Table 2, respectively ($d_{gap}$=4.0 μm, alignment film AL-1051). VHR and ID of the resultant liquid crystal display devices were measured. Also, image sticking of the resultant liquid crystal display devices was evaluated. The results are shown in Table 5.

[Chem. 20]

| Chemical structure | Ratio | Abbreviation |
|---|---|---|
| 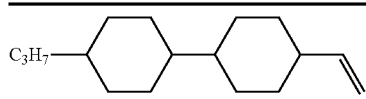 | 48% | 3-Cy—Cy-1d0 |
| 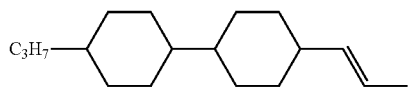 | 4% | 3-Cy—Cy-1d1 |
| 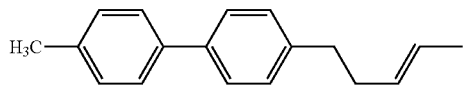 | 8% | 1-Ph—Ph-3d1 |
| 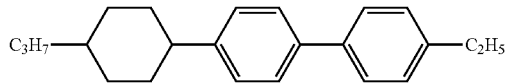 | 5% | 3-Cy—Ph—Ph-2 |
| 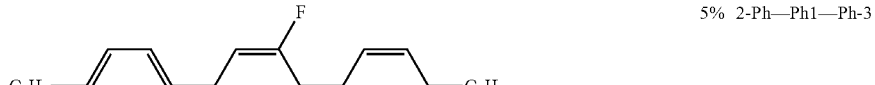 | 5% | 2-Ph—Ph1—Ph-3 |
| 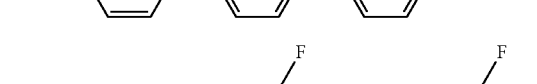 | 2% | 3-Ph—Ph3—CFFO—Ph3—F |
| 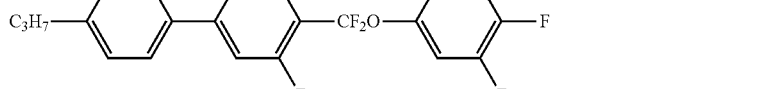 | 3% | 3-Cy—Cy—CFFO—Ph3—F |
| 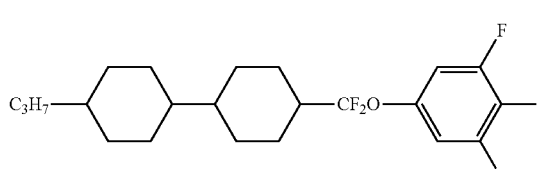 | 7% | 3-Ph—Ph1—Ph3—CFFO—Ph3—F |
| 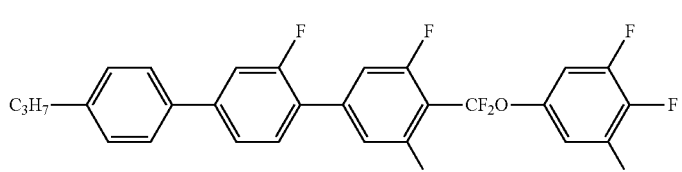 | 5% | 4-Cy—Cy—Ph3—CFFO—Ph3—F |

TABLE 4

| | |
|---|---|
| $T_{NI}/°C.$ | 75.8 |
| $\Delta n$ | 0.112 |
| $n_o$ | 1.488 |
| $\epsilon_\perp$ | 5.5 |
| $\Delta\epsilon$ | 2.9 |
| $\eta/mPa·s$ | 13.5 |

TABLE 5

| | Example 1 | Example 2 | Example 3 | Example 4 |
|---|---|---|---|---|
| Liquid crystal composition | Liquid crystal composition 1 | Liquid crystal composition 1 | Liquid crystal composition 1 | Liquid crystal composition 1 |
| Color filter | Color filter 1 | Color filter 2 | Color filter 3 | Color filter 4 |
| VHR | 99.4 | 99.2 | 99.7 | 99.7 |
| ID | 31 | 52 | 14 | 16 |

TABLE 5-continued

|  | Example 1 | Example 2 | Example 3 | Example 4 |
|---|---|---|---|---|
| Image sticking | A | B | A | A |

It is found that the liquid crystal composition 1 has a liquid crystal layer temperature of 75.8° C. in a practical range as a TV liquid crystal composition, a large absolute value of dielectric constant anisotropy, low viscosity, and optimum $\Delta n$.

The liquid crystal display devices of Examples 1 to 4 could realize high VHR and small ID. Also, in evaluation of image sticking, no residual image or slight residual image at an allowable level was observed.

Examples 5 to 12

As in Example 1, each of liquid crystal compositions 2 and 3 shown in Table 6 was held, and liquid crystal display devices of Examples 5 to 12 were formed by using the color filters shown in Table 2 VHR and ID of the resultant liquid crystal display devices were measured. Also, image sticking of the resultant liquid crystal display devices was evaluated. The results are shown in Tables 7 and 8.

TABLE 6

| Compound name | Content (%) |
|---|---|
| Liquid crystal composition 2 | |
| 4-Cy-Cy-1d0 | 15 |
| 0d1-Cy-Cy-Ph-1 | 4 |
| 0d3-Cy-Cy-Ph-1 | 14 |
| 3-Cy-Ph—Ph-Cy-3 | 3 |
| 3-Cy-Ph—Ph1-Cy-3 | 4 |
| 1-Cy-Cy-Ph3—F | 9 |
| 2-Cy-Ph—Ph3—F | 10 |
| 3-Cy-Ph—Ph3—F | 10 |
| 5-Cy-Ph—Ph3—F | 5 |
| 0d1-Cy-Cy-Ph1—F | 8 |
| 3-Cy-Cy-Ph1—Ph3—F | 8 |
| 2-Ph—Ph3—CFFO—Ph3—F | 4 |
| 3-Ph—Ph3—CFFO—Ph3—F | 6 |
| Tni/° C. | 100.7 |
| $\Delta n$ | 0.094 |
| $\Delta \in$ | 8.0 |
| γ1/mPa · s | 108 |
| η/mPa · s | 22.2 |
| Liquid crystal composition 3 | |
| 5-Cy-Cy-1d0 | 5 |
| 3-Cy-Cy-1d1 | 10 |
| 0d1-Cy-Cy-Ph-1 | 8 |
| 5-Cy-Cy-Ph—O1 | 6 |
| 2-Ph—Ph1—Ph-3 | 8 |
| 2-Cy-Cy-Ph3—F | 11 |
| 3-Cy-Cy-Ph3—F | 15 |
| 5-Cy-Cy-Ph3—F | 5 |
| 3-Cy-Ph—Ph3—F | 6 |
| 3-Cy-Ph—Ph1—F | 9 |
| 4-Cy-Cy-Ph—OCFFF | 4 |
| 3-Cy-Cy-CFFO—Ph3—F | 7 |
| 5-Cy-Cy-CFFO—Ph3—F | 4 |
| 3-Cy-Cy-Ph1—Ph3—F | 2 |
| Tni/° C. | 103.2 |
| $\Delta n$ | 0.102 |
| $\Delta \in$ | 7.1 |
| γ1/mPa · s | 96 |
| η/mPa · s | 20.8 |

TABLE 7

|  | Example 5 | Example 6 | Example 7 | Example 8 |
|---|---|---|---|---|
| Liquid crystal composition | Liquid crystal composition 2 | Liquid crystal composition 2 | Liquid crystal composition 2 | Liquid crystal composition 2 |
| Color filter | Color filter 1 | Color filter 2 | Color filter 3 | Color filter 4 |
| VHR | 99.4 | 99.2 | 99.7 | 99.5 |
| ID | 38 | 87 | 16 | 22 |
| Image sticking | A | B | A | A |

TABLE 8

|  | Example 9 | Example 10 | Example 11 | Example 12 |
|---|---|---|---|---|
| Liquid crystal composition | Liquid crystal composition 3 | Liquid crystal composition 3 | Liquid crystal composition 3 | Liquid crystal composition 3 |
| Color filter | Color filter 1 | Color filter 2 | Color filter 3 | Color filter 4 |
| VHR | 99.3 | 99.3 | 99.8 | 99.7 |
| ID | 49 | 54 | 13 | 16 |
| Image sticking | A | A | A | A |

The liquid crystal display devices of Examples 5 to 12 could realise high VHR and small ID. Also, in evaluation of image sticking, no residual image or slight residual image at an allowable level was observed.

Examples 13 to 24

As in Example 1, each of liquid crystal compositions 4 to 6 shown in Table 9 was held, and liquid crystal display devices of Examples 13 to 24 were formed by using the color filters shown in Table 2. VHR and ID of the resultant liquid crystal display devices were measured. Also, image sticking of the resultant liquid crystal display devices was evaluated. The results are shown in Tables 10 to 12.

TABLE 9

| Compound name | Content (%) |
|---|---|
| Liquid crystal composition 4 | |
| 5-Cy-Cy-1d0 | 15 |
| 3-Cy-Cy-1d1 | 2 |
| 0d1-Cy-Cy-Ph-1 | 12 |
| 2-Ph—Ph1—Ph-3 | 3 |
| 2-Ph—Ph1—Ph-4 | 3 |
| 2-Cy-Cy-Ph3—F | 8 |
| 2-Cy-Ph—Ph3—F | 3 |
| 3-Cy-Ph—Ph3—F | 9 |
| 4-Cy-Cy-Ph—OCFFF | 14 |
| 3-Ph—Ph3—CFFO—Ph3—F | 11 |
| 2-Cy-Cy-CFFO—Ph3—F | 9 |
| 3-Cy-Cy-CFFO—Ph3—F | 8 |
| 3-Cy-Cy-Ph1—Ph3—F | 3 |
| Tni/° C. | 90.2 |
| $\Delta n$ | 0.098 |
| $\Delta \in$ | 9.1 |
| γ1/mPa · s | 90 |
| η/mPa · s | 18.1 |
| Liquid crystal composition 5 | |
| 5-Cy-Cy-1d0 | 10 |
| 3-Cy-Cy-1d1 | 5 |
| 0d1-Cy-Cy-Ph-1 | 8 |
| 0d3-Cy-Cy-Ph-1 | 12 |

TABLE 9-continued

| Compound name | Content (%) |
|---|---|
| 2-Ph—Ph1—Ph-5 | 2 |
| 3-Cy-Ph—Ph-Cy-3 | 3 |
| 3-Cy-Ph—Ph1-Cy-3 | 3 |
| 1-Cy-Ph-Ph3—F | 9 |
| 2-Cy-Cy-Ph3—F | 10 |
| 3-Cy-Cy-Ph3—F | 6 |
| 5-Cy-Cy-Ph3—F | 5 |
| 0d1-Cy-Cy-Ph1—F | 8 |
| 2-Ph—Ph3—CFFO—Ph3—F | 4 |
| 3-Ph—Ph3—CFFO—Ph3—F | 6 |
| 3-Cy-Cy-Ph1—Ph3—F | 9 |
| Tni/° C. | 110.0 |
| Δn | 0.099 |
| Δ∈ | 8.3 |
| γ1/mPa·s | 112 |
| η/mPa·s | 23.4 |
| Liquid crystal composition 6 | |
| 5-Cy-Cy-1d0 | 12 |
| 3-Cy-Cy-1d1 | 25 |
| 3-Cy-Cy-1d1 | 12 |
| 0d1-Cy-Cy-Ph-1 | 4 |
| 0d3-Cy-Cy-Ph-1 | 9 |
| 2-Ph—Ph1—Ph3—F | 5 |
| 3-Ph—Ph1—Ph3—F | 9 |
| 2-Ph—Ph3—CFFO—Ph3—F | 4 |
| 3-Ph—Ph3—CFFO—Ph3—F | 6 |
| 3-Cy-Cy-CFFO—Ph3—F | 2 |
| 5-Cy-Cy-CFFO—Ph3—F | 3 |
| 3-Cy-Cy-Ph1—Ph3—F | 9 |
| Tni/° C. | 77.4 |
| Δn | 0.101 |
| Δ∈ | 7.0 |
| γ1/mPa·s | 86 |
| η/mPa·s | 14.2 |

TABLE 10

| | Example 13 | Example 14 | Example 15 | Example 16 |
|---|---|---|---|---|
| Liquid crystal composition | Liquid crystal composition 4 | Liquid crystal composition 4 | Liquid crystal composition 4 | Liquid crystal composition 4 |
| Color filter | Color filter 1 | Color filter 2 | Color filter 3 | Color filter 4 |
| VHR | 99.3 | 99.4 | 99.8 | 99.6 |
| ID | 55 | 46 | 12 | 15 |
| Image sticking | A | A | A | A |

TABLE 11

| | Example 17 | Example 18 | Example 19 | Example 20 |
|---|---|---|---|---|
| Liquid crystal composition | Liquid crystal composition 5 | Liquid crystal composition 5 | Liquid crystal composition 5 | Liquid crystal composition 5 |
| Color filter | Color filter 1 | Color filter 2 | Color filter 3 | Color filter 4 |
| VHR | 99.4 | 99.3 | 99.6 | 99.6 |
| ID | 56 | 72 | 17 | 15 |
| Image sticking | A | B | A | A |

TABLE 12

| | Example 21 | Example 22 | Example 23 | Example 24 |
|---|---|---|---|---|
| Liquid crystal composition | Liquid crystal composition 6 | Liquid crystal composition 6 | Liquid crystal composition 6 | Liquid crystal composition 6 |
| Color filter | Color filter 1 | Color filter 2 | Color filter 3 | Color filter 4 |
| VHR | 99.3 | 99.5 | 99.6 | 99.7 |
| ID | 74 | 42 | 17 | 14 |
| Image sticking | B | A | A | A |

The liquid crystal display devices of Examples 13 to 24 could realize high VHR and small ID. Also, in evaluation of image sticking, no residual image or slight residual image at an allowable level was observed.

Examples 25 to 36

An electrode structure was formed on each of first and second substrates, and a horizontal alignment-type alignment film was formed on each of the facing surfaces of the substrates and weakly rubbed to form a TN cell. Then, each of liquid crystal compositions 7 to 9 shown in Table 13 was held between the first substrate and the second substrate. Next, liquid crystal display devices of Examples 25 to 36 were formed by using the color filters 1 to 4 shown in Table 2 ($d_{gap}$=3.5 μm, alignment film SE-7492). VHR and ID of the resultant liquid crystal display devices were measured. Also, image sticking of the resultant liquid crystal display devices was evaluated. The results are shown in Tables 14 to 16.

TABLE 13

| Compound name | Content (%) |
|---|---|
| Liquid crystal composition 7 | |
| 3-Cy-Cy-1d0 | 38 |
| 3-Cy-Cy-1d1 | 9 |
| 0d1-Cy-Cy-Ph-1 | 16 |
| 0d3-Cy-Cy-Ph-1 | 4 |
| 2-Ph—Ph3—CFFO—Ph3—F | 2 |
| 3-Ph—Ph3—CFFO—Ph3—F | 12 |
| 3-Cy-Cy-CFFO—Ph3—F | 7 |
| 3-Ph—Ph—Ph1—Ph3—F | 1 |
| 3-Ph—Ph1—Ph3—CFFO—Ph3—F | 2 |
| 2-Py—Ph—Ph3—CFFO—Ph3—F | 9 |
| Tni/° C. | 76.0 |
| Δn | 0.097 |
| Δ∈ | 6.9 |
| γ1/mPa·s | 83 |
| η/mPa·s | 14.5 |
| Liquid crystal composition 8 | |
| 3-Cy-Cy-1d0 | 38 |
| 3-Cy-Cy-1d1 | 14 |
| 0d3-Cy-Cy-Ph-1 | 8 |
| 3-Ph—Ph3—CFFO—Ph3—F | 9 |
| 3-Cy-Cy-CFFO—Ph3—F | 15 |
| 3-Ph—Ph1—Ph3—CFFO—Ph3—F | 2 |
| 4-Ph—Ph1—Ph3—CFFO—Ph3—F | 7 |
| 5-Ph—Ph1—Ph3—CFFO—Ph3—F | 7 |
| Tni/° C. | 81.8 |
| Δn | 0.099 |
| Δ∈ | 8.0 |
| γ1/mPa·s | 83 |
| η/mPa·s | 14.6 |
| Liquid crystal composition 9 | |
| 3-Cy-Cy-1d0 | 30 |
| 3-Cy-Cy-1d1 | 17 |
| 0d1-Cy-Cy-Ph-1 | 7 |

TABLE 13-continued

| Compound name | Content (%) |
|---|---|
| 0d3-Cy-Cy-Ph-1 | 7 |
| 3-Cy-Cy-Ph-2 | 2 |
| 2-Ph—Ph1—Ph-4 | 2 |
| 2-Ph—Ph1—Ph3—F | 8 |
| 3-Ph—Ph1—Ph3—F | 12 |
| 3-Ph—Ph3—Ph3—F | 4 |
| 3-Cy-Cy-Ph1—CFFO—Ph3—F | 11 |
| Tni/° C. | 75.0 |
| Δn | 0.112 |
| Δ∈ | 8.7 |
| γ1/mPa · s | 87 |
| η/mPa · s | 15.2 |

TABLE 14

|  | Example 25 | Example 26 | Example 27 | Example 28 |
|---|---|---|---|---|
| Liquid crystal composition | Liquid crystal composition 7 | Liquid crystal composition 7 | Liquid crystal composition 7 | Liquid crystal composition 7 |
| Color filter | Color filter 1 | Color filter 2 | Color filter 3 | Color filter 4 |
| VHR | 99.2 | 99.4 | 99.5 | 99.6 |
| ID | 80 | 43 | 22 | 14 |
| Image sticking | B | A | A | A |

TABLE 15

|  | Example 29 | Example 30 | Example 31 | Example 32 |
|---|---|---|---|---|
| Liquid crystal composition | Liquid crystal composition 8 | Liquid crystal composition 8 | Liquid crystal composition 8 | Liquid crystal composition 8 |
| Color filter | Color filter 1 | Color filter 2 | Color filter 3 | Color filter 4 |
| VHR | 99.1 | 99.3 | 99.7 | 99.6 |
| ID | 89 | 67 | 11 | 16 |
| Image sticking | B | A | A | A |

TABLE 16

|  | Example 33 | Example 34 | Example 35 | Example 36 |
|---|---|---|---|---|
| Liquid crystal composition | Liquid crystal composition 9 | Liquid crystal composition 9 | Liquid crystal composition 9 | Liquid crystal composition 9 |
| Color filter | Color filter 1 | Color filter 2 | Color filter 3 | Color filter 4 |
| VHR | 99.2 | 99.5 | 99.8 | 99.7 |
| ID | 72 | 36 | 12 | 17 |
| Image sticking | A | A | A | A |

The liquid crystal display devices of Examples 25 to 36 could realize high VHR and small ID. Also, in evaluation of image sticking, no residual image or slight residual image at an allowable level was observed.

Examples 37 to 44

An electrode structure was formed on at least one of first and second substrates, and a horizontal alignment-type alignment film was formed on each of the facing surfaces of the substrates and weakly rubbed to form a FFS cell. Then, each of liquid crystal compositions 10 and 11 shown in Table 17 was held between the first substrate and the second substrate. Next, liquid crystal display devices of Examples 37 to 44 were formed by using the color filters 1 to 4 shown in Table 2 ($d_{gap}$=4.0 μm, alignment film AL-1051). VHR and ID of the resultant liquid crystal display devices were measured. Also, image sticking of the resultant liquid crystal display devices was evaluated. The results are shown in Tables 18 and 19.

TABLE 17

| Compound name | Content (%) |
|---|---|
| Liquid crystal composition 10 | |
| 3-Cy-Cy-1d0 | 39 |
| 3-Cy-Cy-1d1 | 7 |
| 0d1-Cy-Cy-Ph-1 | 11 |
| 2-Ph—Ph1—Ph-3 | 8 |
| 2-Ph—Ph1—Ph-5 | 8 |
| 3-Ph—Ph3—CFFO—Ph3—F | 10 |
| 3-Cy-Cy-Ph—Ph3—F | 6 |
| 4-Ph—Ph1—Ph3—CFFO—Ph3—F | 11 |
| Tni/° C. | 76.0 |
| Δn | 0.114 |
| Δ∈ | 6.0 |
| γ1/mPa · s | 77 |
| η/mPa · s | 13.3 |
| Liquid crystal composition 11 | |
| 3-Cy-Cy-1d0 | 44 |
| 3-Cy-Cy-1d1 | 3 |
| 2-Ph—Ph-3d1 | 13 |
| 3-Cy-Ph—Ph-2 | 7 |
| 2-Ph—Ph1—Ph-3 | 8 |
| 3-Ph—Ph1—Ph-3 | 7 |
| 3-Ph—Ph1—Ph3—CFFO—Ph3—F | 9 |
| 4-Cy-Cy-Ph1—CFFO—Ph3—F | 3 |
| 3-Cy-Ph3—Ph1—OCFFF | 6 |
| Tni/° C. | 77.9 |
| Δn | 0.131 |
| Δ∈ | 4.6 |
| γ1/mPa · s | 74 |
| η/mPa · s | 12.4 |

TABLE 18

|  | Example 37 | Example 38 | Example 39 | Example 40 |
|---|---|---|---|---|
| Liquid crystal composition | Liquid crystal composition 10 | Liquid crystal composition 10 | Liquid crystal composition 10 | Liquid crystal composition 10 |
| Color filter | Color filter 1 | Color filter 2 | Color filter 3 | Color filter 4 |
| VHR | 99.2 | 99.3 | 99.5 | 99.6 |
| ID | 79 | 52 | 26 | 18 |
| Image sticking | B | A | A | A |

TABLE 19

|  | Example 41 | Example 42 | Example 43 | Example 44 |
|---|---|---|---|---|
| Liquid crystal composition | Liquid crystal composition 11 | Liquid crystal composition 11 | Liquid crystal composition 11 | Liquid crystal composition 11 |
| Color filter | Color filter 1 | Color filter 2 | Color filter 3 | Color filter 4 |
| VHR | 99.3 | 99.4 | 99.7 | 99.6 |
| ID | 68 | 57 | 12 | 18 |
| Image sticking | A | A | A | A |

The liquid crystal display devices of Examples 37 to 44 could realize high VHR and small ID. Also, in evaluation of image sticking, no residual image or slight residual image at an allowable level was observed.

Examples 45 to 56

As in Example 37, each of liquid crystal compositions. 12 to 14 shown in Table 20 was held, and liquid crystal display devices of Examples 45 to 56 were formed by using the color filters shown in Table 2. VHR and ID of the resultant liquid crystal display devices were measured. Also, image sticking of the resultant liquid crystal display devices was evaluated. The results are shown in Tables 21 to 23.

TABLE 20

| Compound name | Content (%) |
|---|---|
| Liquid crystal composition 12 | |
| 3-Cy-Cy-1d0 | 47 |
| 3-Cy-Cy-1d1 | 9 |
| 3-Cy-Cy-Ph-2 | 7 |
| 2-Ph—Ph1—Ph-3 | 4 |
| 2-Ph—Ph1—Ph-5 | 7 |
| 3-Cy-Ph—Ph-Cy-3 | 2 |
| 2-Ph—Ph1—Ph-3 | 6 |
| 3-Ph—Ph1—Ph-3 | 7 |
| 3-Ph—Ph3—CFFO—Ph3—F | 2 |
| 3-Cy-Cy-Ph1—Ph3—F | 2 |
| 3-Cy-Ph—Ph3—Ph1—OCFFF | 7 |
| Tni/° C. | 80.6 |
| Δn | 0.122 |
| Δ∈ | 6.0 |
| γ1/mPa·s | 65 |
| η/mPa·s | 11.1 |
| Liquid crystal composition 13 | |
| 3-Cy-Cy-1d0 | 29 |
| 5-Cy-Cy-1d1 | 8 |
| 3-Cy-Cy-1d1 | 13 |
| 5-Ph—Ph-1 | 2 |
| 2-Ph—Ph1—Ph-3 | 6 |
| 2-Ph—Ph1—Ph-4 | 6 |
| 2-Ph—Ph1—Ph-5 | 6 |
| 3-Cy-Ph—Ph-Cy-3 | 4 |
| 3-Ph—Ph1—Ph3—F | 9 |
| 2-Ph—Ph3—Ph3—F | 7 |
| 3-Ph—Ph3—CFFO—Ph3—F | 4 |
| 3-Cy-Ph—Cl | 3 |
| 3-Cy-Cy-Ph1—Ph3—F | 3 |
| Tni/° C. | 74.9 |
| Δn | 0.121 |
| Δ∈ | 4.1 |
| γ1/mPa·s | 60 |
| η/mPa·s | 10.8 |
| Liquid crystal composition 14 | |
| 3-Cy-Cy-1d0 | 10 |
| 3-Cy-Cy-1d1 | 6 |
| 3-Cy-Cy-1d1-F | 28 |
| 0d1-Cy-Cy-Ph-1 | 11 |
| 0d3-Cy-Cy-Ph-1 | 10 |
| 2-Ph—Ph1—Ph-3 | 10 |
| 2-Ph—Ph1—Ph-5 | 10 |
| 5-Cy-Ph—Ph1—Ph-2 | 2 |
| 3-Ph—Ph3—CFFO—Ph3—F | 7 |
| 3-Cy-Cy-Ph1—CFFO—Ph3—F | 6 |
| Tni/° C. | 80.0 |
| Δn | 0.110 |
| Δ∈ | 5.9 |
| γ1/mPa·s | 68 |
| η/mPa·s | 11.6 |

TABLE 21

| | Example 45 | Example 46 | Example 47 | Example 48 |
|---|---|---|---|---|
| Liquid crystal composition | Liquid crystal composition 12 | Liquid crystal composition 12 | Liquid crystal composition 12 | Liquid crystal composition 12 |
| Color filter | Color filter 1 | Color filter 2 | Color filter 3 | Color filter 4 |
| VHR | 99.3 | 99.3 | 99.8 | 99.6 |
| ID | 64 | 56 | 11 | 21 |
| Image sticking | A | A | A | A |

TABLE 22

| | Example 49 | Example 50 | Example 51 | Example 52 |
|---|---|---|---|---|
| Liquid crystal composition | Liquid crystal composition 13 | Liquid crystal composition 13 | Liquid crystal composition 13 | Liquid crystal composition 13 |
| Color filter | Color filter 1 | Color filter 2 | Color filter 3 | Color filter 4 |
| VHR | 99.2 | 99.3 | 99.5 | 99.6 |
| ID | 75 | 58 | 27 | 20 |
| Image sticking | B | A | A | A |

TABLE 23

| | Example 53 | Example 54 | Example 55 | Example 56 |
|---|---|---|---|---|
| Liquid crystal composition | Liquid crystal composition 14 | Liquid crystal composition 14 | Liquid crystal composition 14 | Liquid crystal composition 14 |
| Color filter | Color filter 1 | Color filter 2 | Color filter 3 | Color filter 4 |
| VHR | 99.4 | 99.1 | 99.8 | 99.7 |
| ID | 64 | 82 | 14 | 19 |
| Image sticking | A | B | A | A |

The liquid crystal display devices of Examples 45 to 55 could realize high VHR and small ID. Also, in evaluation of image sticking, no residual image or slight residual image at an allowable level was observed.

Examples 57 to 60

A liquid crystal composition 15 was prepared by mixing 0.3% by mass of biphenvl-4,4'-diyl bismethacrylate with the liquid crystal composition 10 used in Example 37. The liquid crystal composition 15 was interposed in a TN cell and then polymerized by ultraviolet irradiation (3.0 J/cal$^2$) for 600 seconds while a driving voltage was applied between electrodes. Next, liquid crystal display devices of Examples 57 to 60 were formed by using the color filters 1 to 4 shown in Table 2, and VHR and ID of the resultant liquid crystal display devices were measured. Also, image sticking of the resultant liquid crystal display devices was evaluated. The results are shown in Table 24.

TABLE 24

| | Example 57 | Example 58 | Example 59 | Example 60 |
|---|---|---|---|---|
| Liquid crystal | Liquid crystal | Liquid crystal | Liquid crystal | Liquid crystal |

TABLE 24-continued

|  | Example 57 | Example 58 | Example 59 | Example 60 |
|---|---|---|---|---|
| composition | composition 15 | composition 15 | composition 15 | composition 15 |
| Color filter | Color filter 1 | Color filter 2 | Color filter 3 | Color filter 4 |
| VHR | 99.4 | 99.4 | 99.6 | 99.6 |
| ID | 65 | 58 | 16 | 17 |
| Image sticking | B | A | A | A |

The liquid crystal display devices of Examples 57 to 60 could realize high VHR and small ID. Also, in evaluation of image sticking, no residual image or slight residual image at an allowable level was observed.

Examples 61 to 64

A liquid crystal composition 16 was prepared by mixing 0.3% by mass of biphenyl-4,4'-diyl bismethacrylate with the liquid crystal composition 8 used in Example 29. The liquid crystal composition 15 was interposed in an IS5 cell and then polymerized by ultraviolet irradiation (3.0 J/cm$^2$) for 600 seconds while a driving voltage was applied between electrodes. Next, liquid crystal display devices of Examples 61 to 64 were formed by using the color filters 1 to 4 shown in Table 2, and VHR and ID of the resultant liquid crystal display devices were measured. Also, image sticking of the resultant liquid crystal display devices was evaluated. The results are shown in Table 25.

TABLE 25

|  | Example 61 | Example 62 | Example 63 | Example 64 |
|---|---|---|---|---|
| Liquid crystal composition | Liquid crystal composition 16 | Liquid crystal composition 16 | Liquid crystal composition 16 | Liquid crystal composition 16 |
| Color filter | Color filter 1 | Color filter 2 | Color filter 3 | Color filter 4 |
| VHR | 99.0 | 99.2 | 99.6 | 99.6 |
| ID | 92 | 65 | 14 | 17 |
| Image sticking | B | B | A | A |

The liquid crystal display devices of Examples 61 to 64 could realize high VHR and small ID. Also, in evaluation of image sticking, no residual image or slight residual image at an allowable level was observed.

Examples 65 to 68

A liquid crystal composition 17 was prepared by mixing 0.3% by mass of 3-fluorobiphenyl-4,4'-diyl bismethacrylate with the liquid crystal composition 6 used in Example 21. The liquid crystal composition 17 was interposed in a FFS cell and then polymerized by ultraviolet irradiation (3.0 J/cm$^2$) for 600 seconds while a driving voltage was applied between electrodes. Next, liquid crystal display devices of Examples 65 to 68 were formed by using the color filters 1 to 4 shown in Table 2, and VHR and ID of the resultant liquid crystal display devices were measured. Also, image sticking of the resultant liquid crystal display devices was evaluated. The results are shown in Table 26.

TABLE 26

|  | Example 65 | Example 66 | Example 67 | Example 68 |
|---|---|---|---|---|
| Liquid crystal composition | Liquid crystal composition 17 | Liquid crystal composition 17 | Liquid crystal composition 17 | Liquid crystal composition 17 |
| Color filter | Color filter 1 | Color filter 2 | Color filter 3 | Color filter 4 |
| VHR | 99.3 | 99.4 | 99.6 | 99.6 |
| ID | 78 | 49 | 19 | 18 |
| Image sticking | B | A | A | A |

The liquid crystal display devices of Examples 65 to 66 could realize high VHR and small ID. Also, in evaluation of image sticking, no residual image or slight residual image at an allowable level was observed.

Comparative Examples 1 to 4

A comparative liquid crystal composition 1 described below was interposed in the IPS cell used in Example 1. Table 27 shows the physical property values of the comparative liquid crystal composition 1. Next, liquid crystal display devices of Comparative Examples 1 to 4 were formed by using the color filters 1 to 4 shown in Table 2, and VHR and ID of the resultant liquid crystal display devices were measured. Also, image sticking of the resultant liquid crystal display devices was evaluated. The results are shown in Table 28.

[Chem. 21]

| Chemical structure | Ratio | Abbreviation |
|---|---|---|
| 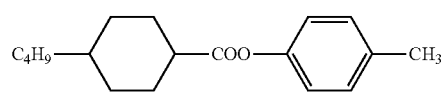 | 27% | 4-Cy—VO—Ph-1 |
| 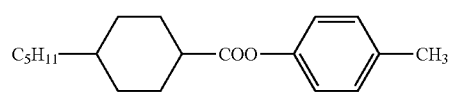 | 20% | 5-Cy—VO—Ph-1 |
| 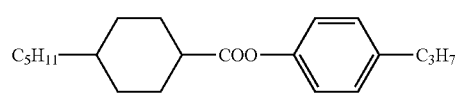 | 20% | 5-Cy—VO—Ph-3 |

[Chem. 21]

| Chemical structure | Ratio | Abbreviation |
|---|---|---|
| 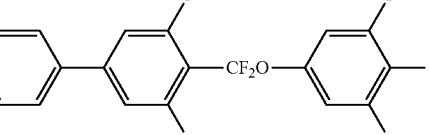 | 8% | 3-Ph—Ph3—CFFO—Ph3—F |
|  | 13% | 3-Cy—Cy—CFFO—Ph3—F |
| 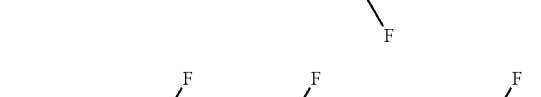 | 12% | 3-Ph—Ph1—Ph3—CFFO—Ph3—F |

TABLE 27

| | |
|---|---|
| $T_{NI}/°C.$ | 69.3 |
| $\Delta n$ | 0.096 |
| no | 1.484 |
| $\epsilon_\perp$ | 5.5 |
| $\Delta\epsilon$ | 4.8 |
| $\eta/mPa \cdot s$ | 30.3 |

TABLE 28

| | Comparative Example 1 | Comparative Example 2 | Comparative Example 3 | Comparative Example 4 |
|---|---|---|---|---|
| Liquid crystal composition | Comparative liquid crystal composition 1 | Comparative liquid crystal composition 1 | Comparative liquid crystal composition 1 | Comparative liquid crystal composition 1 |
| Color filter | Color filter 1 | Color filter 2 | Color filter 3 | Color filter 4 |
| VHR | 98.2 | 98.1 | 98.5 | 98.4 |
| ID | 142 | 157 | 132 | 147 |
| Image sticking | D | D | D | D |

The liquid crystal display devices of Comparative Examples 1 to 4 showed lower VHR and larger ID than the liquid crystal display devices of the present invention. Also, in evaluation of image sticking, the occurrence of residual image at an unallowable level was observed.

Comparative Examples 5 to 12

As in Example 1, each of comparative liquid crystal compositions 2 and 3 shown in Table 29 was interposed, and liquid crystal display devices of Comparative Examples 5 to 12 were formed by using the color filters 1 to 4 shown in Table 2, and VHR and ID of the resultant liquid crystal display devices were measured. Also, image sticking of the resultant liquid crystal display devices was evaluated. The results are shown in Tables 30 and 31.

TABLE 29

| Compound name | Content (%) |
|---|---|
| Comparative liquid crystal composition 2 | |
| 2-Cy-Cy-Ph3—F | 12 |
| 3-Cy-Cy-Ph3—F | 10 |
| 5-Cy-Cy-Ph3—F | 6 |
| 2-Cy-Cy-Ph—OCFFF | 9 |
| 3-Cy-Cy-Ph—OCFFF | 8 |
| 4-Cy-Cy-Ph—OCFFF | 7 |
| 2-Cy-Ph1—Ph3—F | 12 |
| 3-Cy-Ph1—Ph3—F | 10 |
| 2-Cy-Py-Cy-CFFO—Ph3—F | 5.5 |
| 2-Ph—Ph1—Ph3—F | 5.5 |
| 0d1-Cy-Cy-CFFO—Ph3—F | 15 |
| Tni/° C. | 75.7 |
| $\Delta n$ | 0.093 |
| $\gamma 1/mPa \cdot s$ | 146 |
| Comparative liquid crystal composition 3 | |
| 2-Cy-Cy-Ph3—F | 12 |
| 3-Cy-Cy-Ph3—F | 10 |
| 2-Cy-Cy-Ph—OCFFF | 8 |
| 3-Cy-Cy-Ph—OCFFF | 8 |
| 4-Cy-Cy-Ph—OCFFF | 7 |
| 5-Cy-Cy-Ph—OCFFF | 4 |
| 2-Cy-Ph1—Ph3—F | 12 |
| 3-Cy-Ph1—Ph3—F | 4 |
| 2-Cy-Cy-CFFO—Ph3—F | 12 |
| 2-Ph—Ph1—Ph3—F | 8 |
| 0d1-Cy-Cy-CFFO—Ph3—F | 15 |
| Tni/° C. | 75.0 |
| $\Delta n$ | 0.093 |
| $\gamma 1/mPa \cdot s$ | 139 |

TABLE 30

|  | Comparative Example 5 | Comparative Example 6 | Comparative Example 7 | Comparative Example 8 |
|---|---|---|---|---|
| Liquid crystal composition | Comparative liquid crystal composition 2 | Comparative liquid crystal composition 2 | Comparative liquid crystal composition 2 | Comparative liquid crystal composition 2 |
| Color filter | Color filter 1 | Color filter 2 | Color filter 3 | Color filter 4 |
| VHR | 98.1 | 98.2 | 98.3 | 98.2 |
| ID | 150 | 149 | 124 | 144 |
| Image sticking | D | D | C | D |

TABLE 31

|  | Comparative Example 9 | Comparative Example 10 | Comparative Example 11 | Comparative Example 12 |
|---|---|---|---|---|
| Liquid crystal composition | Comparative liquid crystal composition 3 | Comparative liquid crystal composition 3 | Comparative liquid crystal composition 3 | Comparative liquid crystal composition 3 |
| Color filter | Color filter 1 | Color filter 2 | Color filter 3 | Color filter 4 |
| VHR | 98.3 | 98.2 | 98.5 | 98.4 |
| ID | 160 | 168 | 118 | 126 |
| Image sticking | D | D | C | D |

The liquid crystal display devices of Comparative Examples 5 to 12 showed lower VHR and larger ID than the liquid crystal display devices of the present invention. Also, in evaluation of image sticking, the occurrence of residual image at an unallowable level was observed.

Comparative Examples 13 to 20

As in Example 1, each of comparative liquid crystal compositions 4 and 5 shown in Table 32 was interposed, and liquid crystal display devices of Comparative Examples 13 to 24 were formed by using the color filters 1 to 4 shown in Table 2, and VHR and ID of the resultant liquid crystal display devices were measured. Also, image sticking of the resultant liquid crystal display devices was evaluated. The results are shown in Tables 33 and 34.

TABLE 32

| Compound name | Content (%) |
|---|---|
| Comparative liquid crystal composition 4 | |
| 4-Cy—Cy-1d0 | 15 |
| 0d1-Cy—Cy—Ph-1 | 4 |
| 0d3-Cy—Cy—Ph-1 | 14 |
| 3-Cy—Ph—Ph—Cy-3 | 3 |
| 3-Cy—Ph—Ph1—Cy-3 | 4 |
| 1-Cy—Cy—Ph3—F | 9 |
| 2-Cy—Cy—Ph3—F | 10 |
| 3-Cy—Cy—Ph3—F | 10 |
| 5-Cy—Cy—Ph3—F | 5 |
| 3-Cy—Ph1—Ph3—F | 8 |
| 5-Cy—Ph1—Ph3—F | 7 |
| 3-Ph—Ph1—Ph3—F | 3 |
| 3-Cy—Cy—Ph1—Ph3—F | 8 |
| Tni/° C. | 101.0 |
| Δn | 0.095 |
| Δ∈ | 8.2 |
| γ1/mPa·s | 115 |
| η/mPa·s | 23.6 |
| Comparative liquid crystal composition 5 | |
| 2-Cy—Cy-1d0 | 32 |
| 0d1-Cy—Cy—Ph-1 | 4 |
| 2-Ph—Ph1—Ph-3 | 10 |
| 2-Ph—Ph1—Ph-5 | 11 |
| 3-Ph—Ph1—Ph-5 | 7 |
| 2-Cy—Cy—Ph—F | 6 |
| 3-Cy—Cy—Ph—F | 21 |
| 5-Cy—Ph—Ph—F | 7 |
| 3-Cy—Ph—Ph3—F | 2 |
| Tni/° C. | 77.2 |
| Δn | 0.135 |
| Δ∈ | 45 |
| γ1/mPa·s | 57 |
| η/mPa·s | 105 |

TABLE 33

|  | Comparative Example 13 | Comparative Example 14 | Comparative Example 15 | Comparative Example 16 |
|---|---|---|---|---|
| Liquid crystal composition | Comparative liquid crystal composition 4 | Comparative liquid crystal composition 4 | Comparative liquid crystal composition 4 | Comparative liquid crystal composition 4 |
| Color filter | Color filter 1 | Color filter 2 | Color filter 3 | Color filter 4 |
| VHR | 98.0 | 98.2 | 98.3 | 98.3 |
| ID | 178 | 142 | 148 | 146 |
| Image sticking | D | D | D | D |

TABLE 34

|  | Comparative Example 17 | Comparative Example 18 | Comparative Example 19 | Comparative Example 20 |
|---|---|---|---|---|
| Liquid crystal composition | Comparative liquid crystal composition 5 | Comparative liquid crystal composition 5 | Comparative liquid crystal composition 5 | Comparative liquid crystal composition 5 |
| Color filter | Color filter 1 | Color filter 2 | Color filter 3 | Color filter 4 |
| VHR | 98.1 | 98.2 | 98.2 | 98.3 |
| ID | 180 | 153 | 131 | 137 |
| Image sticking | D | D | C | D |

The liquid crystal display devices of Comparative Examples 13 to 20 showed lower VHR and larger ID than the liquid crystal display devices of the present invention. Also, in evaluation of image sticking, the occurrence of residual image at an unallowable level was observed.

Comparative Examples 21 to 32

As in Example 1, each of comparative liquid crystal compositions 6 to 8 shown in Table 35 was interposed, and liquid crystal display devices of Comparative Examples 21 to 32 were formed by using the color filters 1 to 4 shown in Table 2, and VHR and ID of the resultant liquid crystal display devices were measured. Also, image sticking of the resultant liquid crystal display devices was evaluated. The results are shown in Tables 36 to 38.

TABLE 35

| Compound name | Content (%) |
|---|---|
| Comparative liquid crystal composition 6 | |
| 4-Cy—Cy-1d0 | 18 |
| 3-Cy—Cy-4 | 15 |
| 0d1-Cy—Cy—Ph-1 | 8 |
| 2-Ph—Ph1—Ph-3 | 10 |
| 2-Ph—Ph1—Ph-5 | 6 |
| 3-Ph—Ph1—Ph-5 | 6 |
| 2-Cy—Cy—Ph—F | 6 |
| 3-Cy—Cy—Ph—F | 10 |
| 5-Cy—Ph—Ph—F | 7 |
| 3-Cy—Ph—Ph3—F | 14 |
| Tni/° C. | 73.5 |
| $\Delta n$ | 0.126 |
| $\Delta \varepsilon$ | 4.9 |
| $\gamma 1/mPa \cdot s$ | 94 |
| $\eta/mPa \cdot s$ | 16.9 |
| Comparative liquid crystal composition 7 | |
| 4-Cy—Cy-1d0 | 18 |
| 3-Cy—Cy-4 | 15 |
| 0d1-Cy—Cy—Ph-1 | 8 |
| 2-Ph—Ph1—Ph-3 | 10 |
| 2-Ph—Ph1—Ph-5 | 6 |
| 3-Ph—Ph1—Ph-5 | 5 |
| 2-Cy—Cy—Ph—F | 6 |
| 3-Cy—Cy—Ph—F | 5 |
| 5-Cy—Ph—Ph—F | 7 |
| 3-Cy—Ph—Ph3—F | 15 |
| 3-Cy—Cy—Ph1—Ph3—F | 5 |
| Tni/° C. | 75.7 |
| $\Delta n$ | 0.125 |
| $\Delta \varepsilon$ | 5.5 |
| $\gamma 1/mPa \cdot s$ | 103 |
| $\eta/mPa \cdot s$ | 18.4 |
| Comparative liquid crystal composition 8 | |
| 4-Cy—Cy-1d0 | 17 |
| 3-Cy—Cy-4 | 15 |
| 0d3-Cy—Cy—Ph-1 | 8 |
| 3-Cy—Ph—Ph-2 | 10 |
| 2-Ph—Ph1—Ph-5 | 7 |
| 3-Ph—Ph1—Ph-5 | 7 |
| 2-Cy—Cy-Ph—F | 6 |
| 3-Cy—Cy—Ph—F | 5 |
| 5-Cy—Ph—Ph—F | 7 |
| 3-Cy—Ph—Ph3—F | 14 |
| 3-Cy—Cy—Ph1—Ph3—F | 4 |
| Tni/° C. | 85.3 |
| $\Delta n$ | 0.128 |
| $\Delta \varepsilon$ | 4.8 |
| $\gamma 1/mPa \cdot s$ | 107 |
| $\eta/mPa \cdot s$ | 19.0 |

TABLE 36

| | Comparative Example 21 | Comparative Example 22 | Comparative Example 23 | Comparative Example 24 |
|---|---|---|---|---|
| Liquid crystal composition | Comparative liquid crystal composition 6 | Comparative liquid crystal composition 6 | Comparative liquid crystal composition 6 | Comparative liquid crystal composition 6 |
| Color filter | Color filter 1 | Color filter 2 | Color filter 3 | Color filter 4 |
| VHR | 98.0 | 98.1 | 98.3 | 98.3 |
| ID | 182 | 174 | 140 | 146 |
| Image sticking | D | D | D | D |

TABLE 37

| | Comparative Example 25 | Comparative Example 26 | Comparative Example 27 | Comparative Example 28 |
|---|---|---|---|---|
| Liquid crystal composition | Comparative liquid crystal composition 7 | Comparative liquid crystal composition 7 | Comparative liquid crystal composition 7 | Comparative liquid crystal composition 7 |
| Color filter | Color filter 1 | Color filter 2 | Color filter 3 | Color filter 4 |
| VHR | 98.1 | 98.3 | 98.5 | 98.4 |
| ID | 169 | 147 | 118 | 125 |
| Image sticking | D | D | C | D |

TABLE 38

| | Comparative Example 29 | Comparative Example 30 | Comparative Example 31 | Comparative Example 32 |
|---|---|---|---|---|
| Liquid crystal composition | Comparative liquid crystal composition 8 | Comparative liquid crystal composition 8 | Comparative liquid crystal composition 8 | Comparative liquid crystal composition 8 |
| Color filter | Color filter 1 | Color filter 2 | Color filter 3 | Color filter 4 |
| VHR | 98.1 | 98.0 | 98.3 | 98.4 |
| ID | 162 | 184 | 136 | 122 |
| Image sticking | D | D | D | D |

The liquid crystal display devices of Comparative Examples 21 to 32 showed lower VHR and larger ID than the liquid crystal display devices of the present invention. Also, in evaluation of image sticking, the occurrence of residual image at an unallowable level was observed.

Comparative Example 33 to 44

As in Example 1, each of comparative liquid crystal compositions 9 to 11 shown in Table 39 was interposed, and liquid crystal display devices of Comparative Examples 33 to 44 were formed by using the color filters 1 to 4 shown in Table 2, and VHR and ID of the resultant liquid crystal display devices were measured. Also, image sticking of the resultant liquid crystal display devices was evaluated. The results are shown in Tables 40 to 42.

TABLE 39

| Compound name | Content (%) |
|---|---|
| Comparative liquid crystal composition 9 | |
| 2-Cy—Cy—Ph3—F | 10 |
| 0d1-Cy—Cy—Ph1—F | 8 |
| 2-Ph—Ph3—CFFO—Ph3—F | 4 |
| 3-Cy—Cy—Ph3—F | 10 |
| 2-Ph—Ph3—CFFO—Ph3—F | 6 |
| 3-Cy—Cy—Ph1—Ph3—F | 8 |
| 1-Cy—Cy—Ph3—F | 9 |
| 5-Cy—Cy—Ph3—F | 5 |
| 0d3-Ph—T—Ph-3d0 | 15 |
| 3-Cy—Ph—T—Ph-2 | 14 |
| 0d3-Ph—N—Ph-3d0 | 4 |
| 3-Ph—VO—Cy—VO—Ph-3 | 4 |
| 3-Cy—Cy—VO—Ph—Cy-3 | 3 |
| Tni/° C. | 101.6 |
| Δn | 0.153 |
| Δ∈ | 9.2 |
| γ1/mPa·s | 101 |
| η/mPa·s | 23.7 |
| Comparative liquid crystal composition 10 | |
| 2-Cy—Cy—Ph3—F | 10 |
| 0d1-Cy—Cy—Ph1—F | 8 |
| 2-Ph—Ph3—CFFO—Ph3—F | 4 |
| 3-Cy—Cy—Ph3—F | 10 |
| 2-Ph—Ph3—CFFO—Ph3—F | 6 |
| 3-Cy—Cy—Ph1—Ph3—F | 8 |
| 1-Cy—Cy—Ph3—F | 9 |
| 5-Cy—Cy—Ph3—F | 5 |
| 0d3-Ph—T—Ph-3d0 | 10 |
| 3-Cy—Ph3—T—Ph9-1 | 4 |
| 4-Ph—T—Ph—O2 | 4 |
| 3-Cy—Ph—T—Ph-2 | 7 |
| 5-Cy—VO—Ph-1 | 5 |
| 3-Ph—VO—Cy—VO—Ph-3 | 7 |
| 3-Cy—Cy—VO—Ph—Cy-3 | 3 |
| Tni/° C. | 96.4 |
| Δn | 0.137 |
| Δ∈ | 8.8 |
| γ1/mPa·s | 90 |
| η/mPa·s | 25.9 |
| Comparative liquid crystal composition 11 | |
| 2-Cy—Cy—Ph3—F | 10 |
| 0d1-Cy—Cy—Ph1—F | 8 |
| 3-Cy—Cy—Ph3—F | 10 |
| 2-Ph—Ph3—CFFO—Ph3—F | 6 |
| 3-Cy—Cy—Ph1—Ph3—F | 8 |
| 5-Cy—Cy—Ph3—F | 5 |
| 0d3-Ph—T—Ph-3d0 | 10 |
| 3-Cy—Ph3—T—Ph9-1 | 4 |
| 3-Cy—Cy—CFFO—Ph3—F | 4 |
| 4-Ph—T—Ph—O2 | 4 |
| 5-Cy—Cy—CFFO—Ph3—F | 9 |
| 5-Cy—VO—Ph-1 | 5 |
| 0d3-Ph—N—Ph-3d0 | 7 |
| 3-Ph—VO—Cy—VO—Ph-3 | 7 |
| 3-Cy—Cy—VO—Ph-Cy-3 | 3 |
| Tni/° C. | 99.2 |
| Δn | 0.136 |
| Δ∈ | 7.8 |
| γ1/mPa·s | 105 |
| η/mPa·s | 26.6 |

TABLE 40

|  | Comparative Example 33 | Comparative Example 34 | Comparative Example 35 | Comparative Example 36 |
|---|---|---|---|---|
| Liquid crystal composition | Comparative liquid crystal composition 9 | Comparative liquid crystal composition 9 | Comparative liquid crystal composition 9 | Comparative liquid crystal composition 9 |
| Color filter | Color filter 1 | Color filter 2 | Color filter 3 | Color filter 4 |
| VHR | 98.1 | 98.2 | 98.6 | 98.5 |
| ID | 153 | 144 | 126 | 130 |
| Image sticking | D | D | D | D |

TABLE 41

|  | Comparative Example 37 | Comparative Example 38 | Comparative Example 39 | Comparative Example 40 |
|---|---|---|---|---|
| Liquid crystal composition | Comparative liquid crystal composition 10 | Comparative liquid crystal composition 10 | Comparative liquid crystal composition 10 | Comparative liquid crystal composition 10 |
| Color filter | Color filter 1 | Color filter 2 | Color filter 3 | Color filter 4 |
| VHR | 98.1 | 98.3 | 98.5 | 98.4 |
| ID | 157 | 133 | 131 | 128 |
| Image sticking | D | D | C | D |

TABLE 42

|  | Comparative Example 41 | Comparative Example 42 | Comparative Example 43 | Comparative Example 44 |
|---|---|---|---|---|
| Liquid crystal composition | Comparative liquid crystal composition 11 | Comparative liquid crystal composition 11 | Comparative liquid crystal composition 11 | Comparative liquid crystal composition 11 |
| Color filter | Color filter 1 | Color filter 2 | Color filter 3 | Color filter 4 |
| VHR | 98.1 | 98.2 | 98.4 | 98.3 |
| ID | 162 | 148 | 119 | 136 |
| Image sticking | D | D | D | D |

The liquid crystal display devices of Comparative Examples 33 to 44 showed lower VHR and larger ID than the liquid crystal display devices of the present invention. Also, in evaluation of image sticking, the occurrence of residual image at an unallowable level was observed.

Comparative Examples 45 to 52

Liquid crystal display devices of Comparative Examples 45 to 52 were formed by the same method as in Examples 5, 13, 17, 25, 37, 45, 61, and 65 except that the comparative color filter 1 shown in Table 2 was used in place of the color filter 1, and VHR and ID of the resultant liquid crystal display devices were measured. Also, image sticking of the resultant liquid crystal display devices was evaluated. The results are shown in Tables 43 and 44.

TABLE 43

| | Comparative Example 45 | Comparative Example 46 | Comparative Example 47 | Comparative Example 48 |
|---|---|---|---|---|
| Liquid crystal composition | Liquid crystal composition 2 | Liquid crystal composition 4 | Liquid crystal composition 5 | Liquid crystal composition 7 |
| Color filter | Comparative Color filter 1 | Comparative Color filter 1 | Comparative Color filter 1 | Comparative Color filter 1 |
| VHR | 97.8 | 98.0 | 98.2 | 98.3 |
| ID | 210 | 196 | 176 | 166 |
| Image sticking | D | D | D | D |

TABLE 44

| | Comparative Example 49 | Comparative Example 50 | Comparative Example 51 | Comparative Example 52 |
|---|---|---|---|---|
| Liquid crystal composition | Liquid crystal composition 10 | Liquid crystal composition 12 | Liquid crystal composition 16 | Liquid crystal composition 17 |
| Color filter | Comparative Color filter 1 | Comparative Color filter 1 | Comparative Color filter 1 | Comparative Color filter 1 |
| VHR | 97.9 | 98.1 | 98.3 | 98.3 |
| ID | 204 | 184 | 169 | 170 |
| Image sticking | D | D | D | D |

The liquid crystal display devices of Comparative Examples 45 to 52 showed lower VHR and larger ID than the liquid crystal display devices of the present invention. Also, in evaluation of image sticking, the occurrence of residual image at an unallowable level was observed.

The invention claimed is:

1. A liquid crystal display device comprising a first substrate, a second substrate, a liquid crystal composition layer held between the first substrate and the second substrate, a color filter including a black matrix and at least RGB three-color pixel portions, a pixel electrode, and a common electrode, wherein the liquid crystal composition layer includes a liquid crystal composition which contains at least one compound represented by general formula (I),

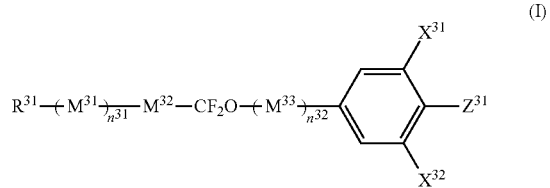

(I)

(in the formula, $R^{31}$ represents an alkyl group having 1 to 10 carbon atoms, an alkoxy group, or an alkenyl group or alkenyloxy group having 2 to 10 carbon atoms, $M^{31}$ to $M^{33}$ each independently represent a trans-1,4-cyclohexylene group or a 1,4-phenylene group, one or two —$CH_2$— in the trans-1,4-cyclohexylene group may be substituted by —O— so that oxygen atoms are not directly adjacent to each other, one or two hydrogen atoms in the phenylene group may be substituted by fluorine atoms, $X^{31}$ and $X^{32}$ each independently represent a hydrogen atom or a fluorine atom, $Z^{31}$ represents a fluorine atom, a trifluoromethoxy group, or a trifluoromethyl group, $n^{31}$ and $n^{32}$ each independently represent 0, 1, or 2, $n^{31}+n^{32}$ represents 0, 1, or 2, and when a plurality of each of $M^{31}$ and $M^{33}$ are present, each may be the same or different), and at least one compound selected from the group consisting of compounds represented by general formula (II-a) to general formula (II-e),

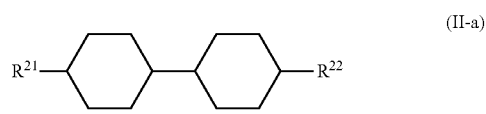

(II-a)

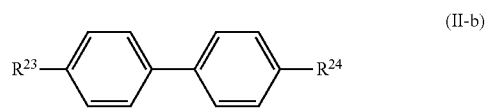

(II-b)

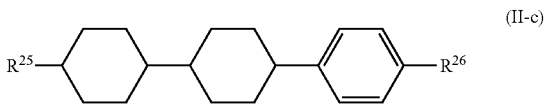

(II-c)

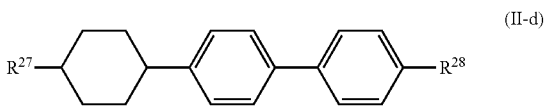

(II-d)

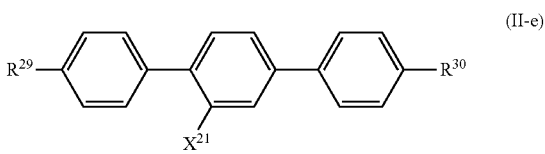

(II-e)

(in the formulae, $R^{21}$ to $R^{30}$ each independently represent an alkyl group having 1 to 10 carbon atoms or an alkenyl group having 2 to 10 carbon atoms, and $X^{21}$ represents a hydrogen atom or a fluorine atom), and the RGB three-color pixel portions include, as colorants, a diketopyrrolopyrrole pigment and/or anionic red organic dye in a R pixel portion, at least one selected from the group consisting of a halogenated copper phthalocyanine pigment, a phthalocyanine green dye, and a mixture of a phthalocyanine blue dye and an azo yellow organic dye in a G pixel portion, and a s-type copper phthalocyanine pigment and/or cationic blue organic dye in a B pixel portion.

2. The liquid crystal display device according to claim 1, wherein the RGB three-color pixel portions include, as colorants, C. I. Solvent Red 124 in the R pixel portion, a mixture of C. I. Solvent Blue 67 and C. I. Solvent Yellow 162 in the G pixel portion, and C. I. Solvent Blue 7 in the B pixel portion.

3. The liquid crystal display device according to claim 1, wherein the RGB three-color pixel portions include, as colorants, C. I. Pigment Red 254 in the R pixel portion, C. I. Pigment Green 7 and/or 36 in the G pixel portion, and C. I. Pigment Blue 15:6 in the B pixel portion.

4. The liquid crystal display device according to claim 1, wherein the R pixel portion further contains at least one organic dye/pigment selected from the group consisting of C.

I. Pigment Red 177, 242, 166, 167, and 179, C. I. Pigment Orange 38 and 71, C. I. Pigment Yellow 150, 215, 185, 138, and 139, C. I. Solvent Red 89, C. I. Solvent Orange 56, and C. I. Solvent Yellow 21, 82, 83:1, 33, and 162.

5. The liquid crystal display device according to claim 1, wherein the G pixel portion further contains at least one organic dye/pigment selected from the group consisting of C. I. Pigment Yellow 150, 215, 185, and 138, and C. I. Solvent Yellow 21, 82, 83:1, and 33.

6. The liquid crystal display device according to claim 1, wherein the B pixel portion further contains at least one organic dye/pigment selected from the group consisting of C. I. Pigment Blue 1, C. I. Pigment Violet 23, C. I. Basic Blue 7, C. I. Basic Violet 10, C. I. Acid Blue 1, 90, and 83, and C. I. Direct Blue 86.

7. The liquid crystal display device according to claim 1, wherein the color filter includes a black matrix, RGB three-color pixel portions, and a Y pixel portion, and contains, as a colorant in the Y pixel portion, at least one yellow organic dye/pigment selected from the group consisting of C. I. Pigment Yellow 150, 215, 185, 138, and 139, and C. I. Solvent Yellow 21, 82, 83:1, 33, and 162.

8. The liquid crystal display device according to claim 1, wherein compounds represented by the general formula (I) are compounds represented by general formula (I-a) to general formula (I-f),

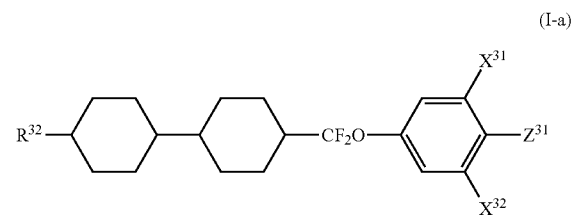
(I-a)

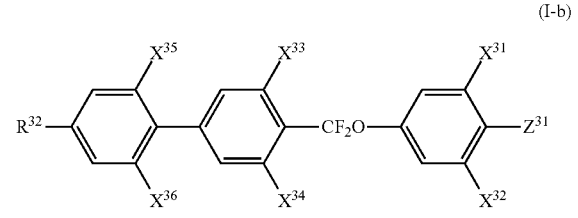
(I-b)

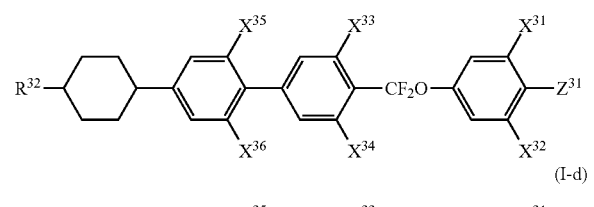
(I-c)

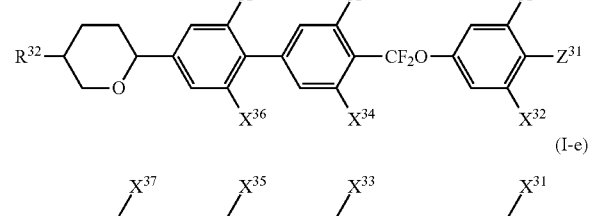
(I-d)

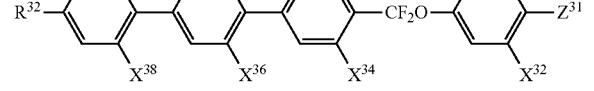
(I-e)

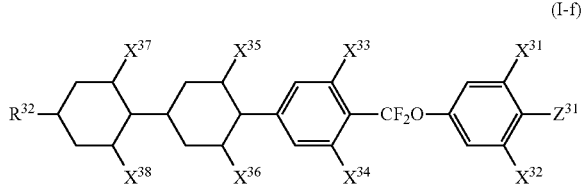
(I-f)

(in the formulae, $R^{32}$ represents an alkyl group having 1 to 10 carbon atoms, an alkoxy group, or an alkenyl group or alkenyloxy group having 2 to 10 carbon atoms, $X^{31}$ to $X^{38}$ each independently represent a hydrogen atom or a fluorine atom, and $Z^{31}$ represents a fluorine atom, a trifluoromethoxy group, or a trifluoromethyl group).

9. The liquid crystal display device according to claim 1, wherein the liquid crystal composition layer further contains at least one compound selected from the compound group represented by general formula (III-a) to general formula (III-f),

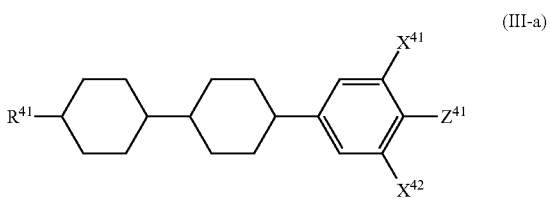
(III-a)

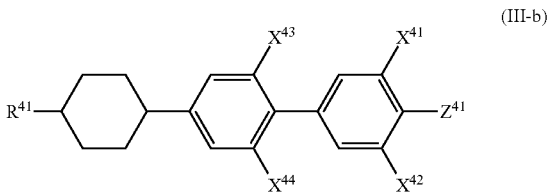
(III-b)

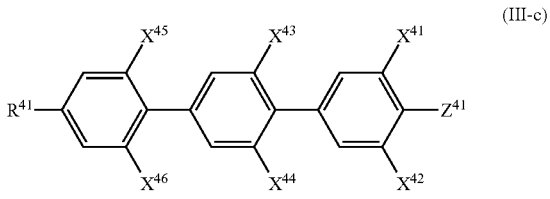
(III-c)

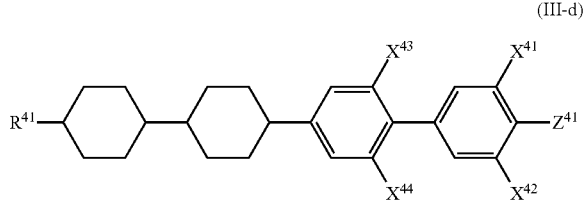
(III-d)

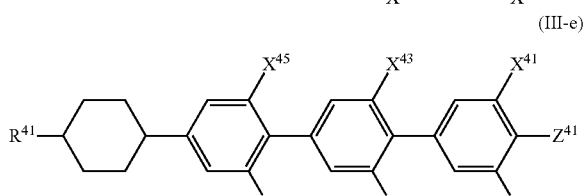
(III-e)

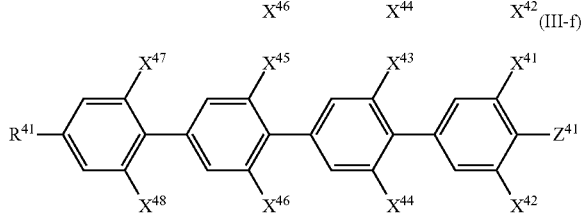
(III-f)

(in the formulae, $R^{41}$ represents an alkyl group having 1 to 10 carbon atoms, an alkoxy group, or an alkenyl group or alkenyloxy group having 2 to 10 carbon atoms, $X^{41}$ to $X^{48}$ each independently represent a hydrogen atom or a fluorine atom, and $Z^{41}$ represents a fluorine atom, a trifluoromethoxy group, or a trifluoromethyl group).

10. The liquid crystal display device according to claim 1, wherein the liquid crystal composition layer includes a polymer produced by polymerizing a liquid crystal composition containing at least one polymerizable compound.

11. The liquid crystal display device according to claim 1, wherein the liquid crystal composition layer contains a difunctional monomer represented by general formula (V),

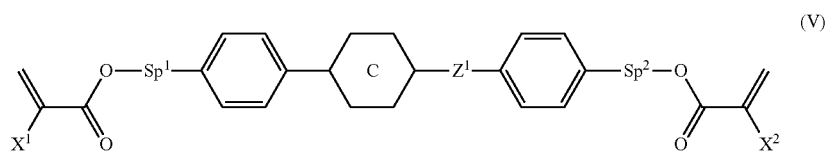

(V)

(in the formula, $X^1$ and $X^2$ each independently represent a hydrogen atom or a methyl group, $Sp^1$ and $Sp^2$ each independently represent a single bond, an alkylene group having 1 to 8 carbon atoms, or —O—$(CH_2)_s$— (wherein s represents an integer of 2 to 7, and an oxygen atom is bonded to an aromatic ring), $Z^1$ represents —OCH$_2$—, —CH$_2$O—, —COO—, —OCO—, —CF$_2$O—, —OCF$_2$—, —CH$_2$CH$_2$—, —CF$_2$CF$_2$—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$═CY$^2$— (wherein Y$^1$ and Y$^2$ each independently represent a fluorine atom or a hydrogen atom), —C≡C—, or a single bond, C represents a 1,4-phenylene group, a trans-1,4-cyclohexylene group, or a single bond, and any desired hydrogen atom of all 1,4-phenylene groups in the formula may be substituted by a fluorine atom).

* * * * *